United States Patent
Ichijo et al.

(10) Patent No.: US 10,523,446 B2
(45) Date of Patent: Dec. 31, 2019

(54) AUTHENTICATION SYSTEM AND AUTHENTICATION METHOD

(71) Applicant: Panasonic Intellectual Property Management Co., Ltd., Osaka (JP)

(72) Inventors: Ayaka Ichijo, Osaka (JP); Manabu Maeda, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 14/934,261

(22) Filed: Nov. 6, 2015

(65) Prior Publication Data

US 2016/0065377 A1   Mar. 3, 2016

Related U.S. Application Data

(63) Continuation of application No. PCT/JP2014/004389, filed on Aug. 27, 2014.

(60) Provisional application No. 61/916,530, filed on Dec. 16, 2013.

(51) Int. Cl.
| | |
|---|---|
| *H04L 9/32* | (2006.01) |
| *H04L 9/08* | (2006.01) |
| *H04L 29/06* | (2006.01) |
| *H04L 29/08* | (2006.01) |

(52) U.S. Cl.
CPC .......... *H04L 9/3268* (2013.01); *H04L 9/0891* (2013.01); *H04L 63/12* (2013.01); *H04L 67/32* (2013.01); *H04L 2209/64* (2013.01)

(58) Field of Classification Search
CPC ..... H04L 9/3268; H04L 9/0891; H04L 63/12; G06F 21/33
See application file for complete search history.

(56) References Cited

U.S. PATENT DOCUMENTS

| | | | | |
|---|---|---|---|---|
| 5,687,235 | A | * 11/1997 | Perlman ............... | H04L 9/3268 380/30 |
| 5,699,431 | A | * 12/1997 | Van Oorschot ....... | H04L 9/3268 380/30 |
| 7,373,503 | B2 | * 5/2008 | Nakano ............ | G11B 20/00086 713/158 |
| 8,438,388 | B2 | * 5/2013 | Thomas .............. | H04L 63/0823 380/231 |

(Continued)

FOREIGN PATENT DOCUMENTS

| | | |
|---|---|---|
| EP | 2267970 | 12/2010 |
| WO | 2013/179534 | 12/2013 |

OTHER PUBLICATIONS

Munoz et al.; PKIX Certificate Status in Hybrid MANETs; 2009; Springer; LNCS 5746, pp. 1-15 (1, 153-166), as printed.*

(Continued)

*Primary Examiner* — Saleh Najjar
*Assistant Examiner* — Michael W Chao
(74) *Attorney, Agent, or Firm* — Greenblum & Bernstein, P.L.C.

(57) ABSTRACT

Upon receiving a new CRL, a device with a large storage capacity in an authentication system detects another device connected to a controller to which this device is connecting, and determines whether or not to transmit the new CRL depending on the magnitude of the storage capacity of the device that has been detected.

19 Claims, 37 Drawing Sheets

(56) References Cited

U.S. PATENT DOCUMENTS

| | | | | |
|---|---|---|---|---|
| 9,054,879 | B2* | 6/2015 | Medvinsky | H04N 21/235 |
| 9,886,574 | B2* | 2/2018 | Le Saint | G06F 21/33 |
| 9,887,982 | B2* | 2/2018 | Andrews | H04L 63/0823 |
| 2002/0004773 | A1* | 1/2002 | Xu | G06Q 40/06 |
| | | | | 705/36 R |
| 2004/0093493 | A1* | 5/2004 | Bisbee | G06Q 20/00 |
| | | | | 713/156 |
| 2005/0138365 | A1* | 6/2005 | Bellipady | H04L 9/3268 |
| | | | | 713/158 |
| 2006/0155855 | A1* | 7/2006 | Hamai | H04L 63/0823 |
| | | | | 709/227 |
| 2007/0016784 | A1* | 1/2007 | Vauclair | G06F 21/10 |
| | | | | 713/176 |
| 2007/0016961 | A1* | 1/2007 | Vogler | G06F 8/62 |
| | | | | 726/30 |
| 2007/0101146 | A1* | 5/2007 | Louch | H04L 63/10 |
| | | | | 713/176 |
| 2008/0184030 | A1* | 7/2008 | Kelly | H04L 9/3268 |
| | | | | 713/156 |
| 2009/0113543 | A1* | 4/2009 | Adams | G06F 21/33 |
| | | | | 726/18 |
| 2009/0187983 | A1* | 7/2009 | Zerfos | H04L 63/0823 |
| | | | | 726/10 |
| 2011/0154017 | A1* | 6/2011 | Edstrom | H04L 63/0823 |
| | | | | 713/151 |
| 2011/0213968 | A1* | 9/2011 | Zhang | H04L 63/20 |
| | | | | 713/158 |
| 2012/0054487 | A1* | 3/2012 | Sun | G06F 21/64 |
| | | | | 713/158 |
| 2014/0129829 | A1 | 5/2014 | Unagami et al. | |
| 2014/0281503 | A1* | 9/2014 | Mills | H04L 9/3263 |
| | | | | 713/157 |
| 2015/0318996 | A1* | 11/2015 | van Roermund | H04L 9/006 |
| | | | | 713/158 |
| 2016/0036794 | A1* | 2/2016 | Adhya | H04L 63/08 |
| | | | | 726/4 |

OTHER PUBLICATIONS

Marias et al.; ADOPT. A Distributed OCSP for Trust Establishment in MANETs; 2005; Retrieved from the Internet <URL: http://ieeexplore.ieee.org/abstract/document/5755348/>; pp. 1-7, as printed.*

Myers et al.; RFC 2560—X.509 Internet Public Key Infrastructure Online Certificate Status Protocol—OCSP; 1999; Retrieved from the Internet <URL: https://www.ietf.org/rfc/rfc2560.txt.pdf>; pp. 1-23, as printed.*

Housley et al.; RFC 3280—Internet X.509 Public Key Infrastructure Certificate and Certificate Revocation List (CRL) Profile; 2002; Retrieved from the Internet <URL: https://www.ietf.org/rfc/rfc3280.txt.pdf>; pp. 1-129, as printed. (Year: 2002).*

Santesson et al.; RFC 6960—X.509 Internet Public Key Infrastructure Online Certificate Status Protocol—OCSP; Jun. 2013; Retrieved from the Internet <URL: https://www.ietf.org/rfc/rfc6960.txt.pdf>; pp. 1-41 as printed. (Year: 2013).*

The Extended European Search Report dated Nov. 7, 2016 for the related European Patent Application No. 14870879.5.

International Search Report of PCT application No. PCT/JP2014/004389 dated Nov. 18, 2014.

"Wi-Fi Certified Wi-Fi Protected Setup" Wi-Fi Alliance, Dec. 2010.

Atsuko Miyaji et al., "Information Security" Ohm-sha pp. 140-147, Oct. 25, 2003 (Partial Translation).

"Suite B Implementer's Guide to FIPS 186-3(ECDSA)" Feb. 3, 2010.

Elaine Barker et al., "Recommendation for Pair-Wise Key Establishment Schemes Using Discrete Logarithm Cryptography" NIST Special Publication 800-56A Revision 2.

D. Forsberg et al., "Protocol for Carrying Authentication for Network Access (PANA)", RFC5191, May 2008.

* cited by examiner

FIG. 3
| DEVICE ID | CERTIFICATE ID |
|---|---|
| DEVICE ID1 | CERTIFICATE ID (M1) |
| DEVICE ID2 | CERTIFICATE ID (M2) |
| DEVICE ID3 | CERTIFICATE ID (M3) |
| ... | ... |
FIG. 4
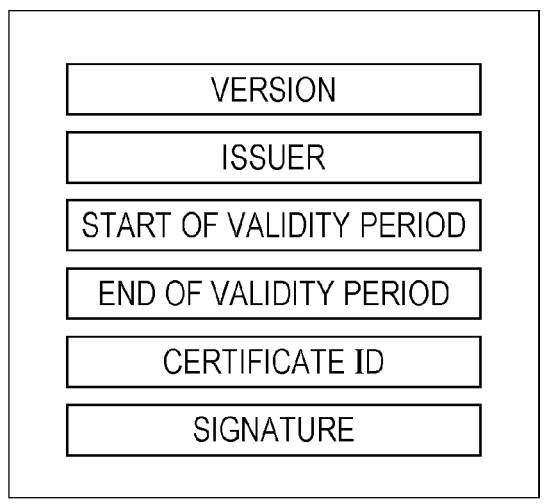
FIG. 5
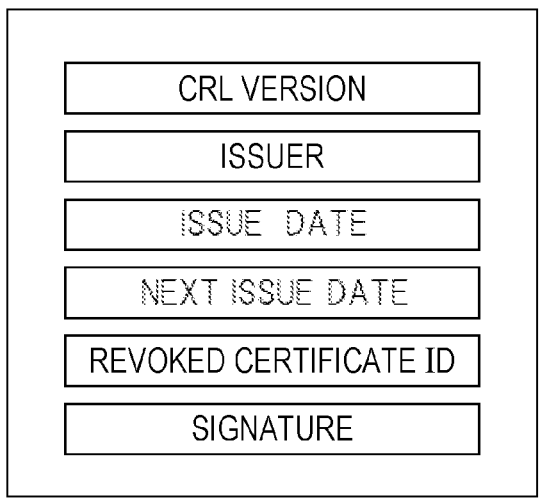

FIG. 7

| CONTROLLER ID | CERTIFICATE ID |
|---|---|
| CONTROLLER ID1 | CERTIFICATE ID (C1) |
| CONTROLLER ID2 | CERTIFICATE ID (C2) |
| . . . | . . . |

FIG. 9

| CONTROLLER ID | CONTROLLER CERTIFICATE ID | DEVICE ID | CERTIFICATE OF DEVICE | HISTORY INFORMATION |
|---|---|---|---|---|
| CONTROLLER ID1 | CERTIFICATE ID (C1) | DEVICE ID1 | CERTIFICATE ID (M1) | HISTORY INFORMATION 1 |
| | | DEVICE ID2 | CERTIFICATE ID (M2) | HISTORY INFORMATION 2 |
| | | DEVICE ID3 | CERTIFICATE ID (M3) | HISTORY INFORMATION 3 |
| ... | ... | ... | ... | ... |

FIG. 20

| CONTROLLER ID | CERTIFICATE ID | SHARED KEY |
|---|---|---|
| CONTROLLER ID1 | CERTIFICATE ID (C1) | 96385 · · · |
| CONTROLLER ID2 | CERTIFICATE ID (C2) | 19283 · · · |
| · · · | · · · | · · · |

FIG. 21

| DEVICE ID | CERTIFICATE ID | SHARED KEY |
|---|---|---|
| DEVICE ID1 | CERTIFICATE ID (M1) | 01234 · · · |
| DEVICE ID2 | CERTIFICATE ID (M2) | 98765 · · · |
| DEVICE ID3 | CERTIFICATE ID (M3) | 19283 · · · |
| · · · | · · · | · · · |

FIG. 36

| CONTROLLER ID | DEVICE ID | STORAGE CAPACITY |
|---|---|---|
| ID OF CONTROLLER 100a | ID OF DEVICE 200a | SMALL |
| ID OF CONTROLLER 100a | ID OF DEVICE 200b | SMALL |
| ID OF CONTROLLER 100b | NULL | NULL |

AUTHENTICATION SYSTEM AND AUTHENTICATION METHOD

BACKGROUND

1. Technical Field

The present disclosure relates to an authentication system that enables a device and controller to be safely connected.

2. Description of the Related Art

In recent years, home electric appliances and audiovisual devices have come to be connected to networks, and there is anticipation for services using various types of history information collected therefrom to the cloud. In this arrangement, a controller is installed in the home, and transmission of history information from the home electric appliance devices to a manufacturer's server is relayed through the controller. Setting the connection between the controller and the home electrical appliances so as to be safe enables communication within the home to be controlled, and leakage of information over wireless communication and connection to the in-home network by spoofing to be prevented.

To this end, the Wi-Fi Alliance has conventionally set forth a standard to facilitate connection among devices, called Wi-Fi Protected Setup (Wi-Fi Alliance, "Wi-Fi CERTIFIED Wi-Fi Protected Setup: Easing the User Experience for Home and Small Office Wi-FiR Networks (2010)", [online], December 2010, [Searched Jun. 24, 2014], Internet <URL: http://www.wi-fi.org/ja/file/wi-fi-certified-wi-fi-protected-setup%E2%84%A2-easing-the-user-experience-for-home-and-small-office-wi>). However, in Wi-Fi wireless connection, this only guarantees interconnection among devices at an access point of devices and home electric appliances, that is equivalent to a controller, and does not guarantee whether a connecting device is valid or not.

Usage of the Public Key Infrastructure (PKI) to authenticate the validity of devices has been conventionally known ("IT Text Information Security" compiled by Atsuko Miyaji/Hiroaki Kikuchi, published by Ohmsha, October 2003 (hereinafter, Miyaji et al)). Authentication based on PKI guarantees the validity of devices by authenticating that an entity (home electric appliance or controller) has a secret key and a public key certificate issued by a certificate authority. Once there is an occurrence of leakage of a secret key or the like regarding a public key certificate, the public key certificate needs to be revoked in order to prevent unauthorized use of the public key certificate. A representative way to revoke a public key certificate is a Certificate Revocation List (CRL) which is a list of certificate revocations (Miyaji et al). A CRL is a list of revoked public key certificates, with IDs and the like of revoked public key certificates affixed with the signature of the certificate authority that has issued the public key certificate, and distributed. The entity such as the home electric appliance or controller verifies whether the public key certificate of another entity to which it is to connect is not listed in the CRL. Accordingly, the newest CRL needs to be used.

SUMMARY

An authentication system includes a first device that connects to a first controller by a first network and to a second controller by a second network, and a second device that connects to the second controller by the second network. Upon the first device receiving a certificate revocation list from the first controller, the first device detects the second device connected to the second controller to which the first device is connected, transmits the certificate revocation list to the second device in a case where storage capacity of the second device is smaller than a predetermined threshold value, and also a certificate identifier of a public key certificate which the second controller to which the second device is connected has, is listed in the certificate revocation list, and does not transmit the certificate revocation list to the second device in a case where storage capacity of the second device is smaller than a predetermined threshold value, and also the certificate identifier is not listed in the certificate revocation list.

According to the present disclosure, further improvement can be realized.

It should be noted that these general or specific embodiments may be implemented as a system, a device, a method, an integrated circuit, a computer program, or a storage medium, or any combination of a system, method, integrated circuit, computer program, and storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of a connection device management table of the controller according to the first embodiment;

FIG. 4 is a diagram illustrating an example of a public key certificate according to the first embodiment;

FIG. 5 is a diagram illustrating an example of a CRL according to the first embodiment;

FIG. 7 is a diagram illustrating an example of a connection controller management table of the device according to the first embodiment;

FIG. 9 is a diagram illustrating an example of a device information management table of the manufacturer server according to the first embodiment;

FIG. 20 is a diagram illustrating an example of a connection controller management table of the device according to the second embodiment;

FIG. 21 is a diagram illustrating an example of a connecting device management table of the controller according to the second embodiment;

FIG. 36 is a diagram illustrating an example of a connecting device management table sorted by controller, of devices according to the third embodiment;

DETAILED DESCRIPTION

Figure 1:
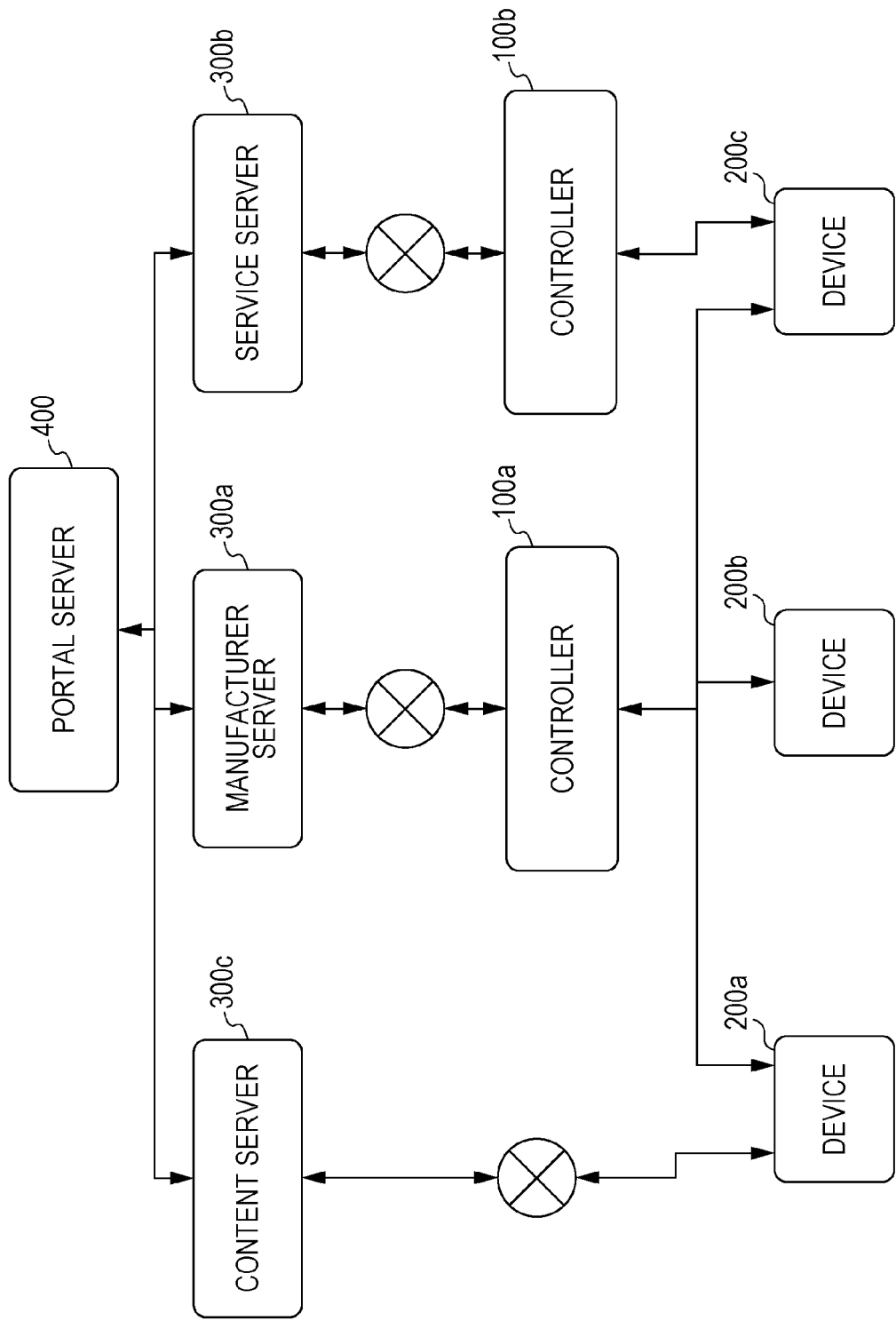
FIG. 1 is an overall configuration diagram of an authentication system according to a first embodiment.

Underlying Knowledge Forming Basis of the Present Disclosure

In a case where a home electric appliance connects only to one controller, the home electric appliance acquires the CRL via the controller. At this time, if the controller is an unauthorized device, even of the public key certificate is listed in the CRL, the home electric appliance will authenticate the controller as an authorized device unless the controller distributes a CRL, in which the public key certificate of the controller is listed, to the home electric appliance.

Also, in a case where a CRL listing certificate IDs of public key certificates of controllers and devices with no devices connected is recorded each time a device CRL is updated, the device storage capacity will be exceeded if the storage capacity is small, so the CRL that is actually necessary cannot be stored in the authentication information storage unit. Based on the above observation, the present inventors arrived at the aspects of the present disclosure.

An authentication system according to an aspect of the present disclosure includes a first device that connects to a first controller by a first network and to a second controller by a second network, and a second device that connects to the second controller by the second network. Upon the first device receiving a certificate revocation list from the first controller, the first device detects the second device connected to the second controller to which the first device is connected, transmits the certificate revocation list to the second device in a case where storage capacity of the second device is smaller than a predetermined threshold value, and also a certificate identifier of a public key certificate which the second controller, to which the second device is connected, is listed in the certificate revocation list, and does not transmit the certificate revocation list to the second device in a case where storage capacity of the second device is smaller than a predetermined threshold value, and also the certificate identifier is not listed in the certificate revocation list.

Accordingly, a device with a small storage capacity can receive and hold a minimally necessary CRL, listing the certificate ID of the public key certificate of a controller with which connection is made, thus preventing connection of an unauthorized controller.

If the storage capacity of the second device is larger than the predetermined threshold value, the first device may transmit the certificate revocation list to the second device.

Accordingly, all devices with large storage capacity can hold all CRLs.

The predetermined threshold value may be the size of one certificate revocation list.

Accordingly, devices with large storage capacity can identify devices with small storage capacity, and can determine whether or not to transmit a CRL to a device with small storage capacity.

Upon receiving the certificate revocation list from the first device, the second device may stop connection to the second controller identified by the certificate identifier listed in the certificate revocation list.

An authentication system according to an aspect of the present disclosure includes a first device that connects to a first controller by a first network, and a second device that connects to the first controller by the first network and to a second controller by a second network. Upon the first device receiving a certificate revocation list from the first controller, the first device detects the second device connected to the first controller, acquires from the second device a certificate identifier of a public key certificate which the second controller has, if the storage capacity of the second device is smaller than a predetermined threshold value, transmits the certificate revocation list to the second device in a case where the certificate identifier is listed in the certificate revocation list, and does not transmit the certificate revocation list to the second device in a case where the certificate identifier is not listed in the certificate revocation list.

Accordingly, even if a device with a large storage capacity receives a CRL listing a certificate ID of a public key certificate of a controller to which it is not connected, the CRL can be transmitted to a device with a small storage capacity, and thus connection to an unauthorized controller can be prevented.

Upon receiving the certificate revocation list from the first device, the second device may stop connection to the second controller identified by the certificate identifier listed in the certificate revocation list.

If the storage capacity of the second device is larger than the predetermined threshold value, the first device may transmit the certificate revocation list to the second device.

Accordingly, all devices with large storage capacity can hold all CRLs.

The authentication system may further include a third device that connects to the second controller by the second network. Upon receiving a certificate revocation list from the first device, the second device detects the third device connecting to the second controller having a public key certificate indicated by a certificate identifier listed in the certificate revocation list, and transmits the certificate revocation list to the third device.

Accordingly, even a device not connected to a common controller with a device having a large storage capacity can hold a CRL, and thus can prevent connecting to an unauthorized controller.

An authentication system according to an aspect of the present disclosure includes a first device that connects to a first controller by a first network, and a second device that connects the first controller by the first network and to a second controller by the second network. The second device receives from the second controller a certificate identifier of a public key certificate of the second controller at the time of connecting to the second controller, and transmits the certificate identifier to the first device, and the first device transmits a certificate revocation list to the second device in a case where the certificate identifier received from the second device is listed in the certificate revocation list that the first device holds, and does not transmit the certificate revocation list to the second device in a case where the certificate identifier is not listed in the certificate revocation list that the first device holds.

Accordingly, a device with a small storage capacity which only has a minimally necessary CRL can determine whether a controller is an authorized controller when connecting to a new controller.

In a case of having received the certificate revocation list, the second device may confirm that the certificate identifier is listed in the certificate revocation list, and stop connection to the second controller.

Accordingly, in a case where a controller to which a device with a small storage capacity newly connects is an unauthorized controller, connection to the unauthorized controller can be prevented at the stage of mechanical connection.

The authentication system according to embodiments of the present disclosure will be described below with reference to the drawings. Note that the embodiment described below indicate a preferred specific example of the present disclosure. That is to say, values, shapes, materials, components, placement and connection arrangement of components, steps, orders of steps, and so forth in the following embodiments are only exemplary, and are not intended to restrict the present disclosure. The present disclosure is defined based on the scope of the Claims. Accordingly, components in the following embodiments which are not included in an independent Claim of the present disclosure indicating the highest concept are described as being components which are not necessarily indispensable in achieving solving of the problem but make up a more preferable form.

First Embodiment

1. System Configuration

An authentication system 10 according to the present disclosure will be described here as an embodiment of the present disclosure, with reference to the drawings.

1.1 Overall Configuration of Authentication System 10

FIG. 1 is a diagram illustrating the overall configuration of the authentication system 10 according to the present disclosure. The authentication system 10 is configured including controllers 100, devices 200, servers 300, and a portal server 400. The controllers 100a and 100b are devices having functions of controlling devices. The controllers 100a and 100b also have functions of connecting to servers, transmitting information of home electric appliances to the server, receiving control requests from the servers, controlling the home electric appliances, and so forth. The devices 200a through 200c are home electric appliances and housing facility devices that collect device history information, such as televisions, recorders, air conditioners, refrigerators, batteries, and so forth.

The servers 300a through 300c are a content server that distributes content, a manufacture server of a manufacturer that manufactures home electric appliances, and a service server of a service provider that provides services. As a specific example, history information of a device in the home is transmitted to the controller, and the control transmits history information of the device to the manufacturer server. Also, in a case where the service server is an electric power company, the electric power company connects to the controller via a home smart meter (omitted from illustration). The controller controls devices in the home based on electric power information from the electric power company, and suppresses consumption of electric power within the home.

1.2 Configuration of Controller 100

Figure 2:
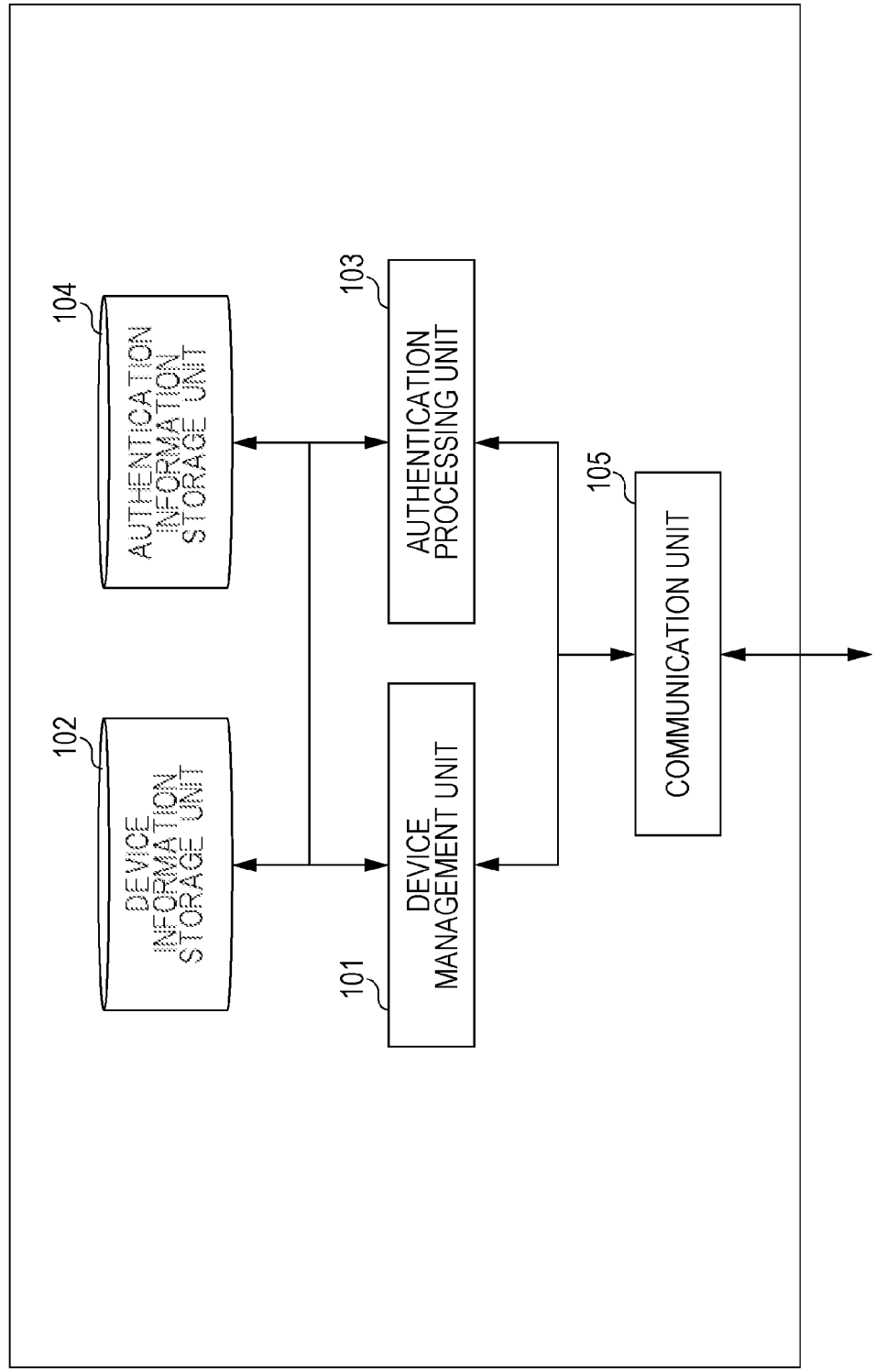
FIG. 2 is a configuration diagram of a controller according to the first embodiment.

FIG. 2 is a configuration diagram of the controller 100a. The controller 100a is configured including a device management unit 101, a device information storage unit 102, an authentication processing unit 103, an authentication information storage unit 104, and a communication unit 105. The controller 100b also is of the same configuration.

The device management unit 101 manages devices connected to the controller. In a case where there is a connection request from a device, the device management unit 101 transmits the public key certificate received from the device to the authentication processing unit 103, and requests authentication processing. The device management unit 101 receives the authentication results from the authentication processing unit 103. In a case where authentication has been successful, the device management unit 101 registers the device ID and certificate ID in a connecting device management table held at the device information storage unit 102.

The device information storage unit 102 manages information of devices connecting to the controller. FIG. 3 is a diagram illustrating an example of a device information management table which the device information storage unit 102 holds. The device information management table records device IDs and certificate IDs of the public key certificates that the devices hold.

The authentication processing unit 103 performs authentication processing with the devices. Also, upon receiving an authentication request from the device management unit 101 along with a public key certificate of a device, the authentication processing unit 103 acquires the CRL recorded in the authentication information storage unit 104, and verifies whether the certificate ID of the public key certificate of the device is recorded in the CRL. The authentication processing unit 103 also verifies the signature of the public key certificate using the public key (omitted from illustration) of the portal server, which is the certificate authority. The authentication processing unit 103 also generates a random number and transmits the random number to the device. The authentication processing unit 103 verifies a signature of the random number received from the device. In a case where any one of the verifications fails, the authentication processing unit 103 determines that the device is an unauthorized device.

The authentication information storage unit 104 holds a key pair of secret key and public key certificate, and the CRL. The secret key, public key certificate, and CRL are embedded in the authentication information storage unit 104 when shipping. FIG. 4 is a diagram illustrating an example of the configuration of a public key certificate. The public key certificate is configured including version, issuer, start and end of validity period, certificate ID, and signature of the portal server, which is the certificate authority. FIG. 5 is a diagram illustrating an example of the configuration of a CRL. The CRL is configured including CRL version, issuer, issue date, next issue date, revoked certificate ID, and signature of the portal server, which is the certificate authority. The certificate ID is not restricted to being one; multiple certificate IDs may be included.

The communication unit 105 communicates with the device 200, manufacturer server 300a, and service server 300b. The communication unit 105 communicates with the server via Secure Socket Layer (SSL) communication. Certificates necessary for SSL communication are recorded at the communication unit 105.

1.3 Configuration of Device 200

Figure 6:
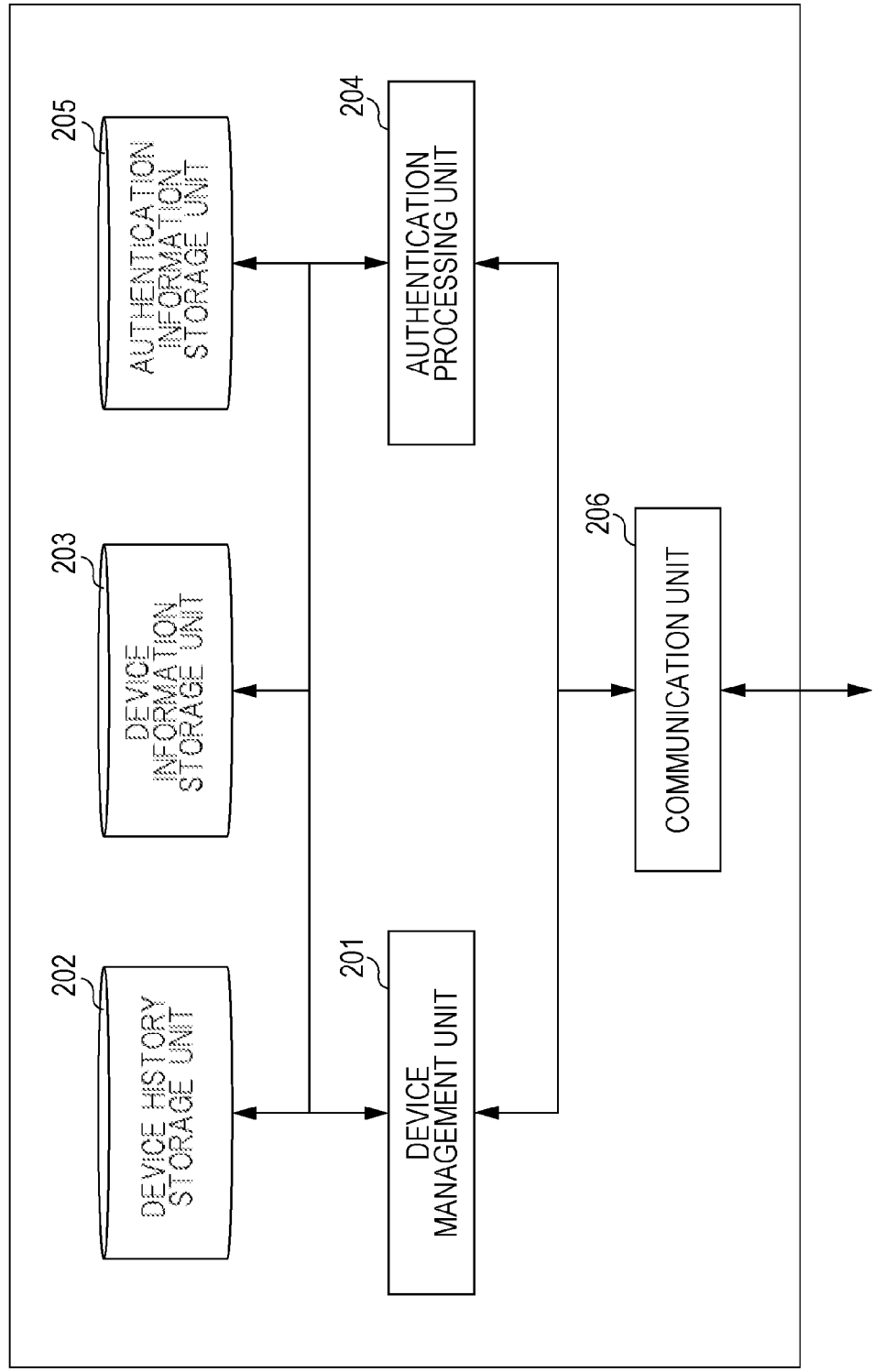
FIG. 6 is a configuration diagram of a device according to the first embodiment.

FIG. 6 is a configuration diagram of the device 200. The device 200 includes a device management unit 201, a device history storage unit 202, a device information storage unit 203, an authentication processing unit 204, an authentication information storage unit 205, and a communication unit 206.

The device management unit 201 transmits a connection request to the controller 100 when starting up. In a case of connecting to the content server 300c instead of connecting to the controller, the communication unit 206 performs SSL communication with the content server 300c. The device management unit 201 transmits an authentication request to the authentication processing unit 204 upon receiving a public key certificate from the controller. The device management unit 201 receives the results of authentication from the authentication processing unit 204. In a case where authentication is successful, the device management unit 201 registers the controller ID and certificate ID in a connecting controller management table held at the device information storage unit 203. The device management unit 201 also periodically or non-periodically transmits device history recorded at the device history storage unit 202 to the server via the controller. Note that in a case where direct connection has been made to the content server, transmission is made to the server without going through the controller.

The device history storage unit 202 acquires and records operation history of the device. The device information storage unit 203 manages information of the controller 100 connecting to the device. FIG. 7 is a diagram illustrating an example of a connecting controller management table which the device information storage unit 203 holds. The connecting controller management table records controller IDs and certificate IDs of the public key certificates which the controllers hold.

The authentication processing unit 204 performs authentication processing with the controller. Also, upon receiving an authentication request from the device management unit 201 along with a public key certificate, the authentication processing unit 204 acquires the CRL recorded in the authentication information storage unit 205, and verifies whether the certificate ID of the public key certificate of the controller is recorded in the CRL. The authentication processing unit 204 also verifies the signature of the public key certificate using the public key (omitted from illustration) of the portal server, which is the certificate authority. The authentication processing unit 204 also generates a random number and transmits the random number to the controller. The authentication processing unit 204 verifies a signature of the random number received from the controller. In a case where any one of the verifications fails, the authentication processing unit 204 determines that the controller is an unauthorized device.

The authentication information storage unit 205 holds a key pair of secret key and public key certificate, and the CRL. The key pair of the secret key and public key certificate, and the CRL are embedded in the authentication information storage unit 205 when shipping the device. The public key certificate and CRL are of the same configuration as the public key certificate and CRL of the controller, so description will be omitted here.

The communication unit 206 communicates with the controller 100 and content server 300c. The communication unit 206 communicates with the content server via SSL communication. Certificates necessary for SSL communication are recorded at the communication unit 206.

1.4 Configuration of Manufacturer Server 300a

Figure 8:
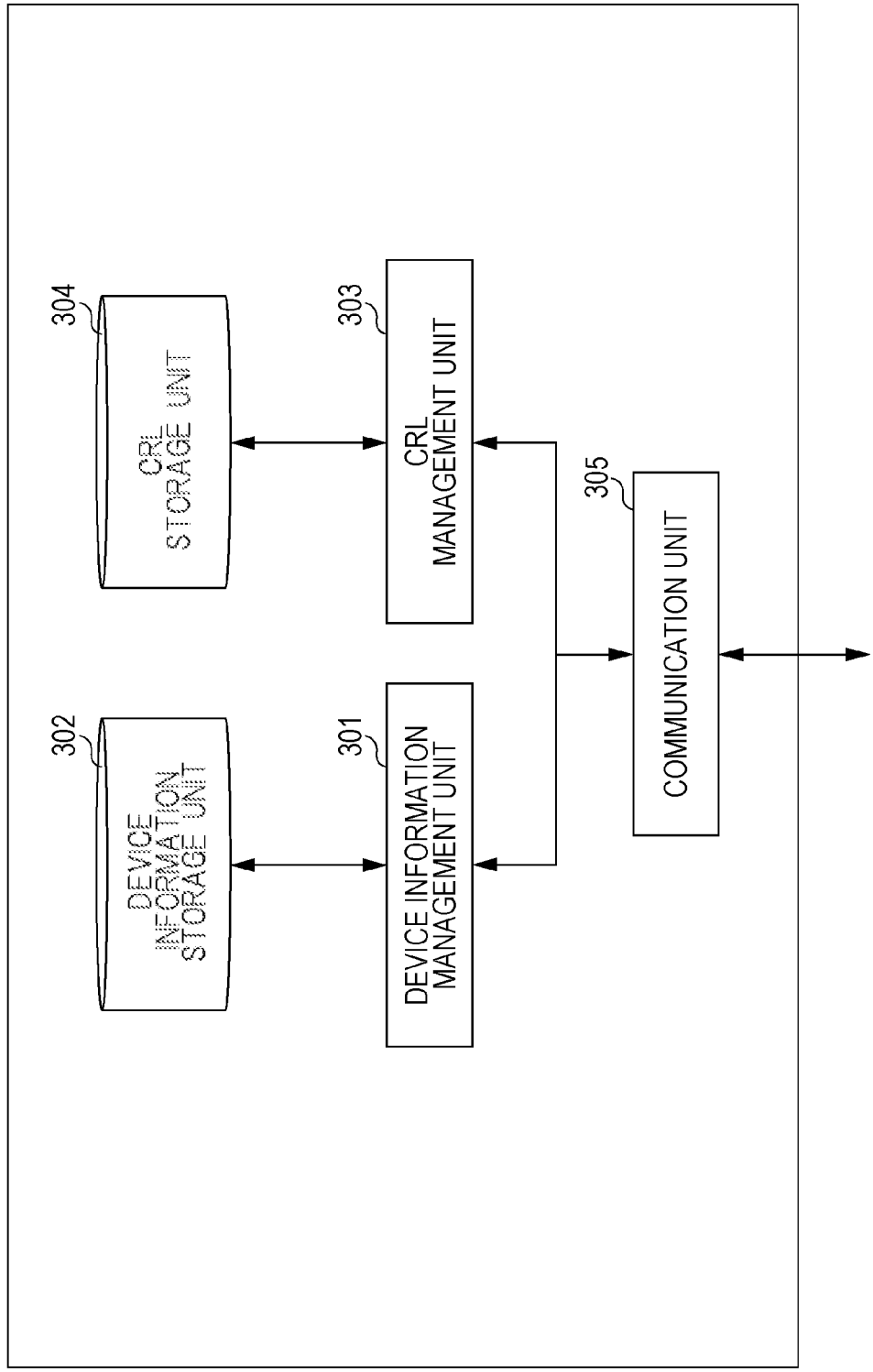
FIG. 8 is a configuration diagram of a manufacturer server according to the first embodiment.

FIG. 8 is a configuration diagram of the manufacturer server 300a. The manufacturer server 300a is configured including a device information management unit 301, a device information storage unit 302, a CRL management unit 303, a CRL storage unit 304, and a communication unit 305. The service server 300b is configured in the same way.

The device information management unit 301 controls the device information storage unit 302, and manages association between controllers and devices, IDs of controllers and devices being connected and certificate IDs of public key certificates, and device history. Also, upon having detected an unauthorized device or controller, the device information management unit 301 notifies the portal server of the certificate ID of the public key certificate of that device or controller, and places a CRL issue request. In a case of having updated the CRL, the device information management unit 301 transmits the CRL to the CRL management unit 303.

The device information storage unit 302 records the IDs and certificate IDs of the controller and devices, and device history. FIG. 9 is a diagram illustrating an example of a device information management table that the device information storage unit 302 holds. This shows that device ID1 through device ID3 are connected to the controller with the controller ID1, which is the ID of the controller. This also shows that the certificate ID of the public key certificate of the controller and the certificate IDs of the public key certificates of the devices also are recorded. This shows that the history information of the device ID1 is recorded in the history information 1.

The CRL management unit 303 controls the CRL storage unit 304, and upon having received a CRL from the device information management unit 301, updates the CRL of the CRL storage unit 304. The CRL storage unit 304 records CRLs.

The communication unit 305 communicates with the controller 100a and the portal server 400. Communication with the controller 100a and portal server 400 is performed via SSL communication. Certificates necessary for SSL communication are recorded in the communication unit 305.

The configuration of the content server 300c differs from that of the manufacturer server 300a. Connection is made with devices without going through the controller, so SSL authentication is performed between the content server 300c and the devices. The device information management table of the device information storage unit 302 is thus a device information management table with no controller information.

1.5 Configuration of Portal Server 400

Figure 10:
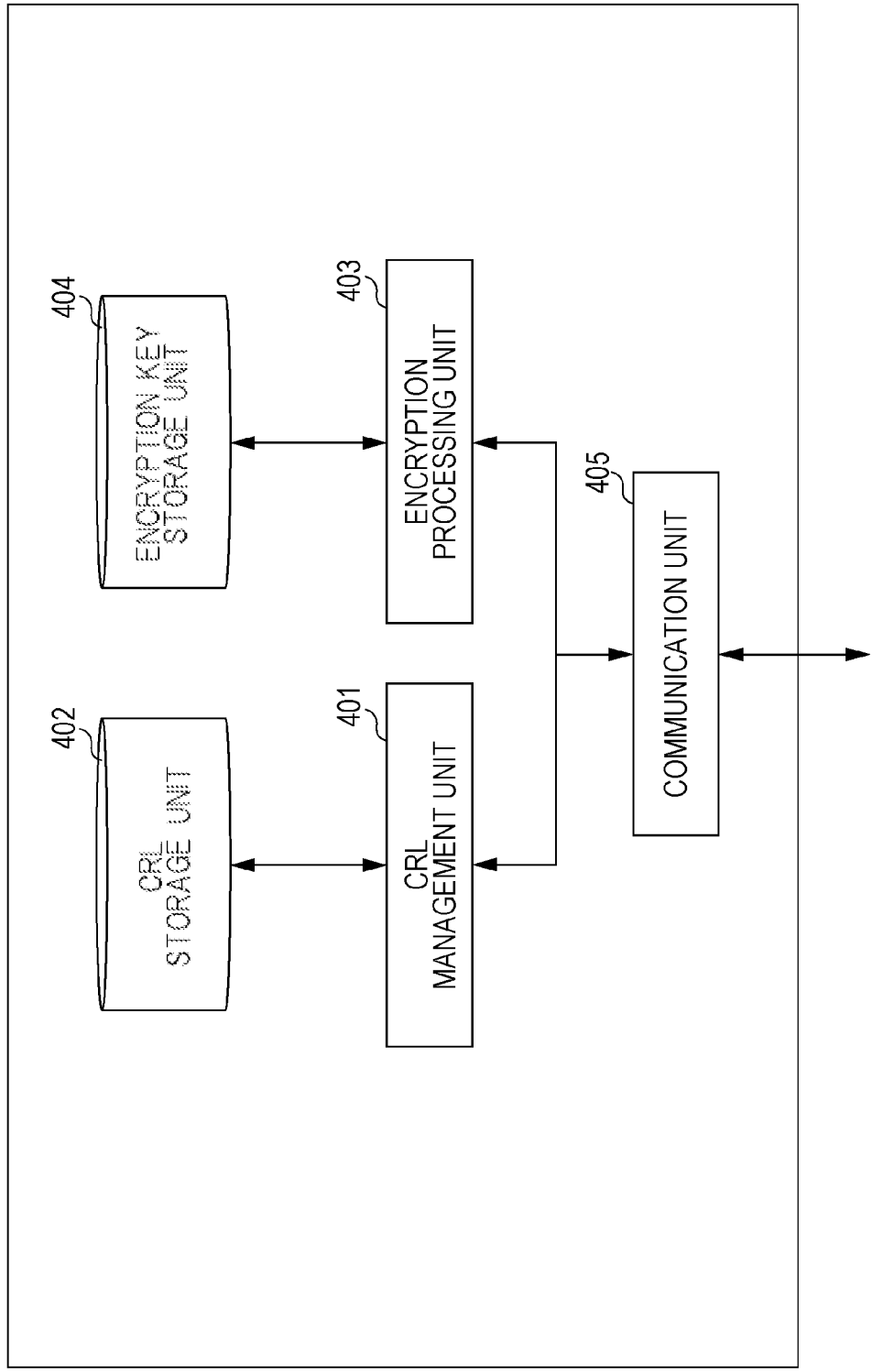
FIG. 10 is a configuration diagram of a portal server according to the first embodiment.

FIG. 10 is a configuration diagram of the portal server 400. The portal server 400 includes a CRL management unit 401, a CRL storage unit 402, an encryption processing unit 403, an encryption key storage unit 404, and a communication unit 405.

The CRL management unit 401 controls the CRL storage unit 402 to manage the CRLs. Upon receiving a CRL issue request from the manufacturer server 300a or service server 300b or the like, the CRL management unit 401 sets data other than signature in the CRL, and requests the encryption processing unit 403 to generate a CRL signature. The CRL management unit 401 receives the CRL with the generated signature from the encryption processing unit 403, and records in the CRL storage unit 402. The CRL storage unit 402 records the issued CRL.

Upon receiving a request for signature generation from the CRL management unit 401, the encryption processing unit 403 uses a secret key held at the encryption key storage unit 404 to generate the CRL signature. Once the CRL signature is generated, the encryption processing unit 403 transmits the generated CRL signature to the CRL management unit 401.

The encryption key storage unit 404 holds the secret key for issuing a CRL for the portal server 400 which is the certificate authority.

The communication unit 405 performs communication with the servers 300a through 300c. The servers 300a through 300c perform SSL communication. Certificates necessary for SSL communication are recorded at the communication unit 405.

1.6 Operations of Authentication System 10

Operations of the authentication system 10 include the following.
(1) Device registration processing where connection is made from device to controller, and registration is made in server
(2) Processing to update CRL of manufacturer server 300a
(3) Processing to update CRL of device These will each be described below with reference to the drawings.

1.6.1 Operations at Time of Device Registration Processing

Figure 11:
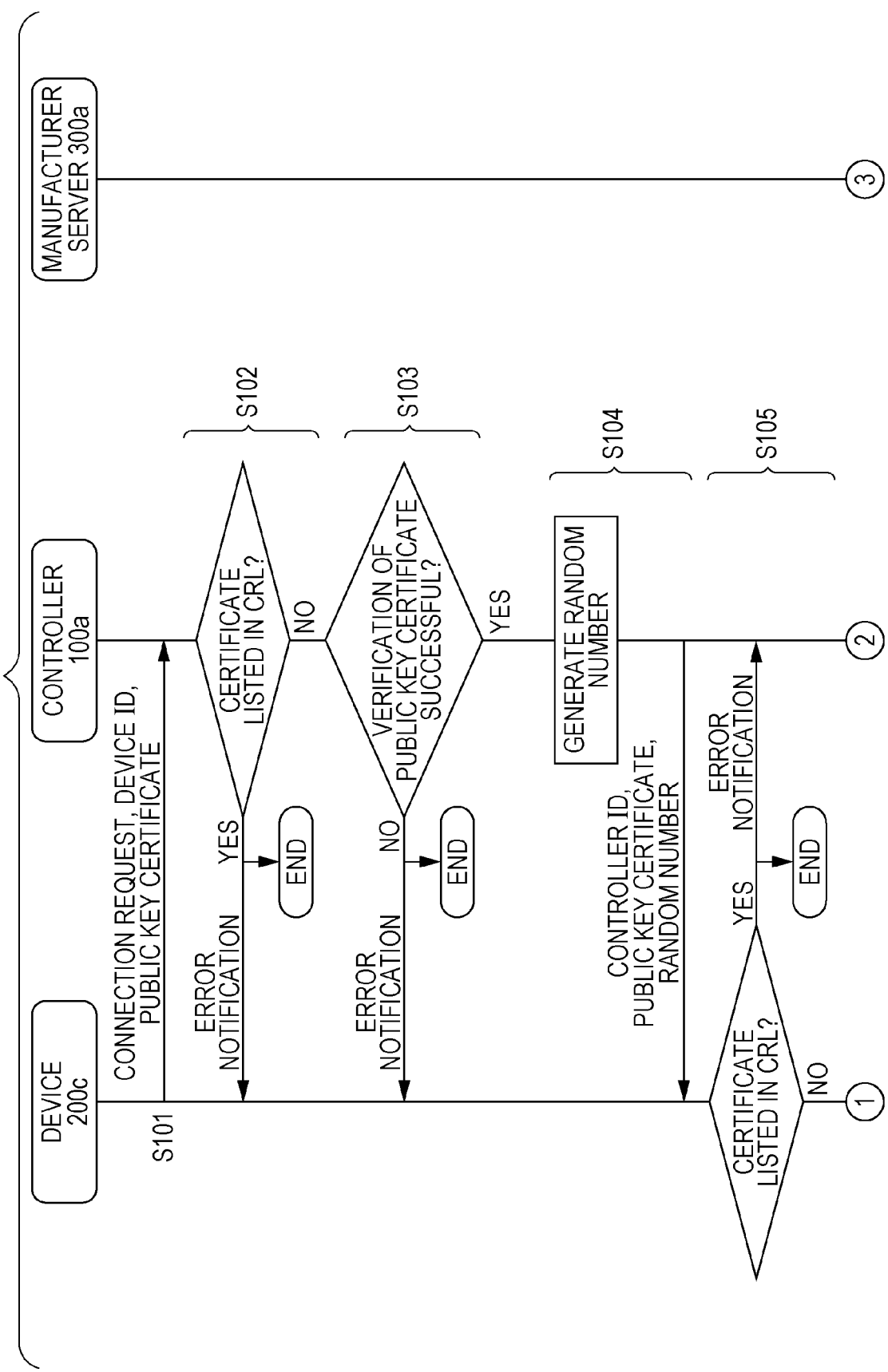
FIG. 11 is a sequence diagram for when registering a device, according to the first embodiment.
Figure 12:
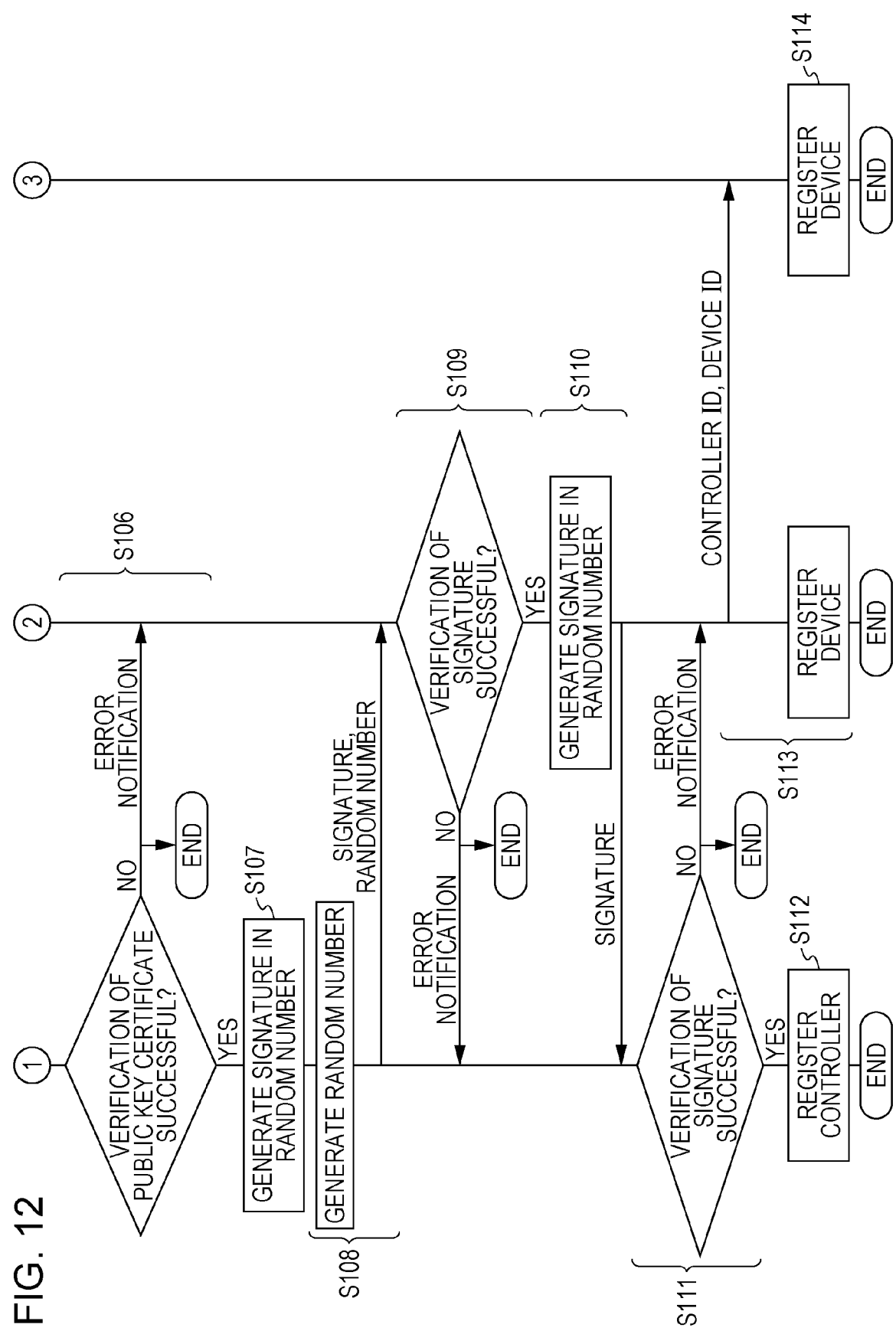
FIG. 12 is a sequence diagram for when registering a device, according to the first embodiment.

FIGS. 11 and 12 illustrate a sequence of processing where the device 200c connects to the controller 100a, and is registered to the manufacturer server 300a. Processing where the device 200a or 200b connect to the controller 100a and are registered to the manufacturer server 300a, and processing where the device 200c connects to the controller 100b and is registered to the service server 300b are the same.

In S101, a connection request is performed from the device 200c to the controller 100a. The device ID and public key certificate of the device are also transmitted at this time.

In S102, verification is performed regarding whether or not the certificate ID of the public key certificate of the device 200c, regarding which the controller 100a has received the connection request, is listed in the CRL held in the authentication information storage unit. If listed in the CRL, an error is notified to the device 200c and the processing ends.

In S103, the controller 100a verifies the signature of the public key certificate received from the device 200c. In a case where the verification is not successful, the device 200c is notified of an error and the processing ends. The signature at this time may be an elliptic curve digital signature algorithm (ECDSA).

ECDSA is described in National Security Agency, "Suite B Implementer's Guide to FIPS 186-3 (ECDSA)", [online], Feb. 3, 2010, [Searched Jun. 24, 2014], Internet <URL: http://www.nsa.gov/ia/_files/ecdsa.pdf>, and accordingly will not be described here.

In S104, the controller 100a generates a random number, and transmits to the device 200c along with the controller ID and public key certificate.

In S105, the device 200c verifies whether the certificate ID of the public key certificate of the controller 100a which has transmitted the connection request is listed in the CRL that it holds. If listed in the CRL, an error is notified to the controller 100a and the processing ends.

In S106, the device 200c verifies the signature of the public key certificate received from the controller 100a. In a case where verification fails, an error is notified to the controller 100a and the processing ends.

In S107, the device 200c generates a signature from the random number received from the controller 100a and the secret key of the device 200c.

In S108, the device 200c generates a random number, and transmits to the controller 100a along with the signature generated in S107.

In S109, the controller 100a receives the signature and random number, and verifies the signature using the public key certificate received in S101. In a case where verification of the signature fails, an error is notified to the device 200c and the processing ends.

In S110, the controller 100a generates a signature from the random number received in S109 and the secret key of the controller 100a, and transmits the signature to the device 200a.

In S111, the device 200c receives the signature, and verifies the signature using the public key certificate received in S104. In a case where verification of the signature fails, an error is notified to the controller 100a and the processing ends.

In S112, in a case where verification in S111 is successful, the device 200c registers the controller in the connecting controller management table.

In S113, the controller 100a transmits the controller ID and certificate ID of the public key certificate, and the device ID of the device regarding which verification was successful in S109 and the certificate ID of the public key certificate, to the manufacturer server, and registers the device ID of the device and the certificate ID of the public key certificate in the connecting device management table.

In S114, upon receiving, from the controller 100a, the controller ID and certificate ID of the public key certificate of the controller 100a and the device ID and certificate ID of the public key certificate of the device 200*c*, the manufacturer server 300*a* registers in the device information management table.

1.6.2 Operations at Time of Processing to Update CRL of Manufacturer Server 300*a*

Figure 13:
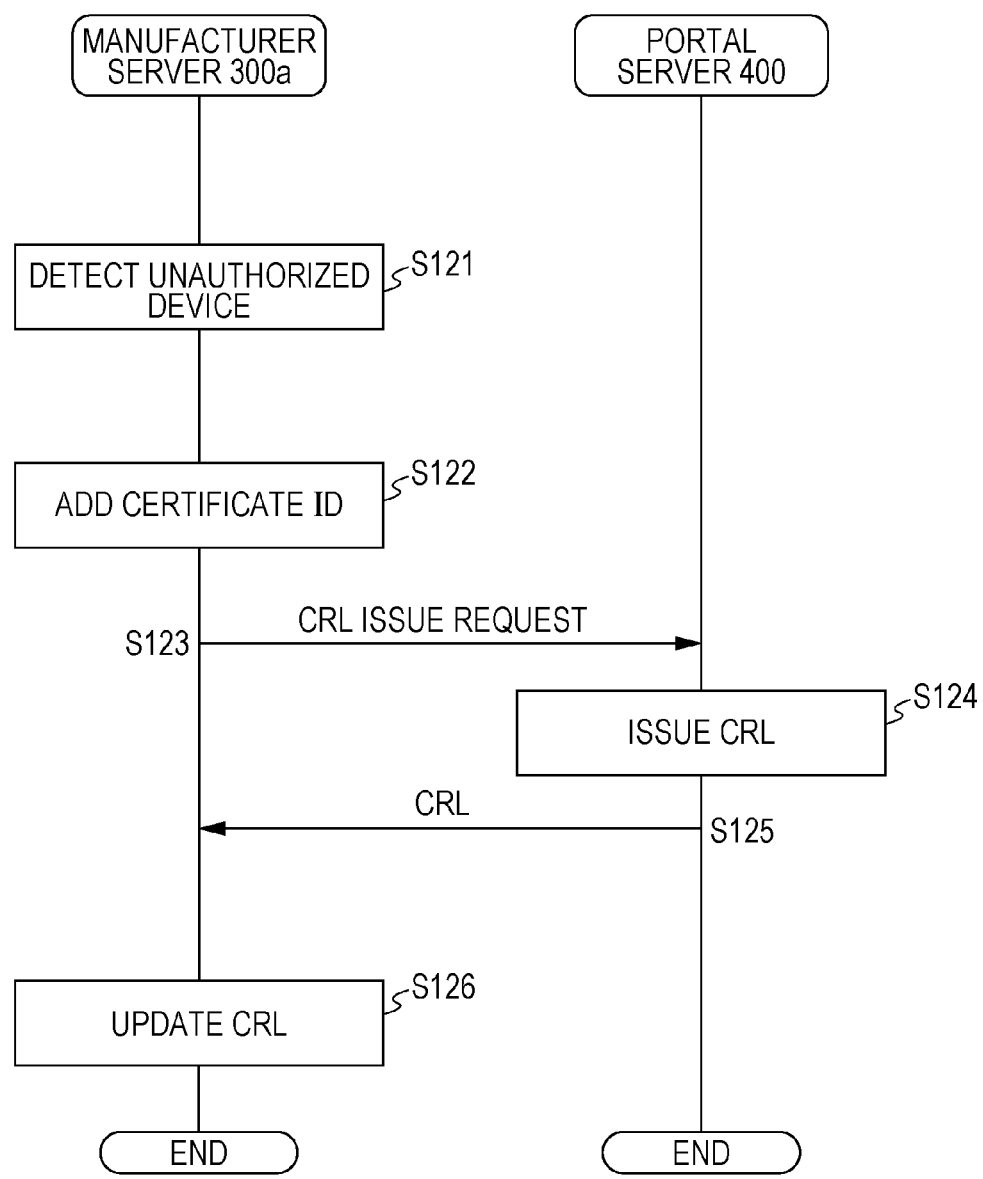
FIG. 13 is a sequence diagram for when updating a CRL of a manufacturer server, according to the first embodiment.

FIG. 13 illustrates a sequence of updating the CRL of the manufacturer server 300*a*. In S121, the manufacturer server 300*a* detects an unauthorized device. Specific examples are a case of detecting multiple controllers connecting to the manufacturer server 300*a* with the same certificate ID, a case of detecting multiple devices of the same certificate ID registered to the manufacturer server 300*a*, and so forth. Also, in a case where leakage of a secret key has been detected, a device or controller having a public key certificate corresponding thereto is also determined to be an unauthorized device.

In S122, the manufacturer server 300*a* adds the certificate ID of the public key certificate of the unauthorized device or the unauthorized controller detected in S121, to the certificate IDs listed in the CRL.

In S123, the manufacturer server 300*a* transmits a CRL issue request along with the certificate IDs of the public key certificates of all unauthorized devices and unauthorized controllers, to the portal server 400 which is the certificate authority.

In S124, the portal server 400 issues a CRL from the received certificate IDs.

In S125, the portal server 400 transmits the CRL to the manufacturer server 300*a*.

In S126, the manufacturer server 300*a* records the received CRL in the CRL storage unit, thereby updating to the newest CRL.

The above is an example of processing of updating the CRL of the manufacturer server 300*a*, but processing for updating CRLs held by the service server 300*b* and content server 300*c* is the same processing.

Also, even if detecting no unauthorized devices in S121, the manufacturer server 300*a* updates the CRL before the next issue date.

1.6.3 Operations at Time of Processing to Update CRL of Device

Figure 14:
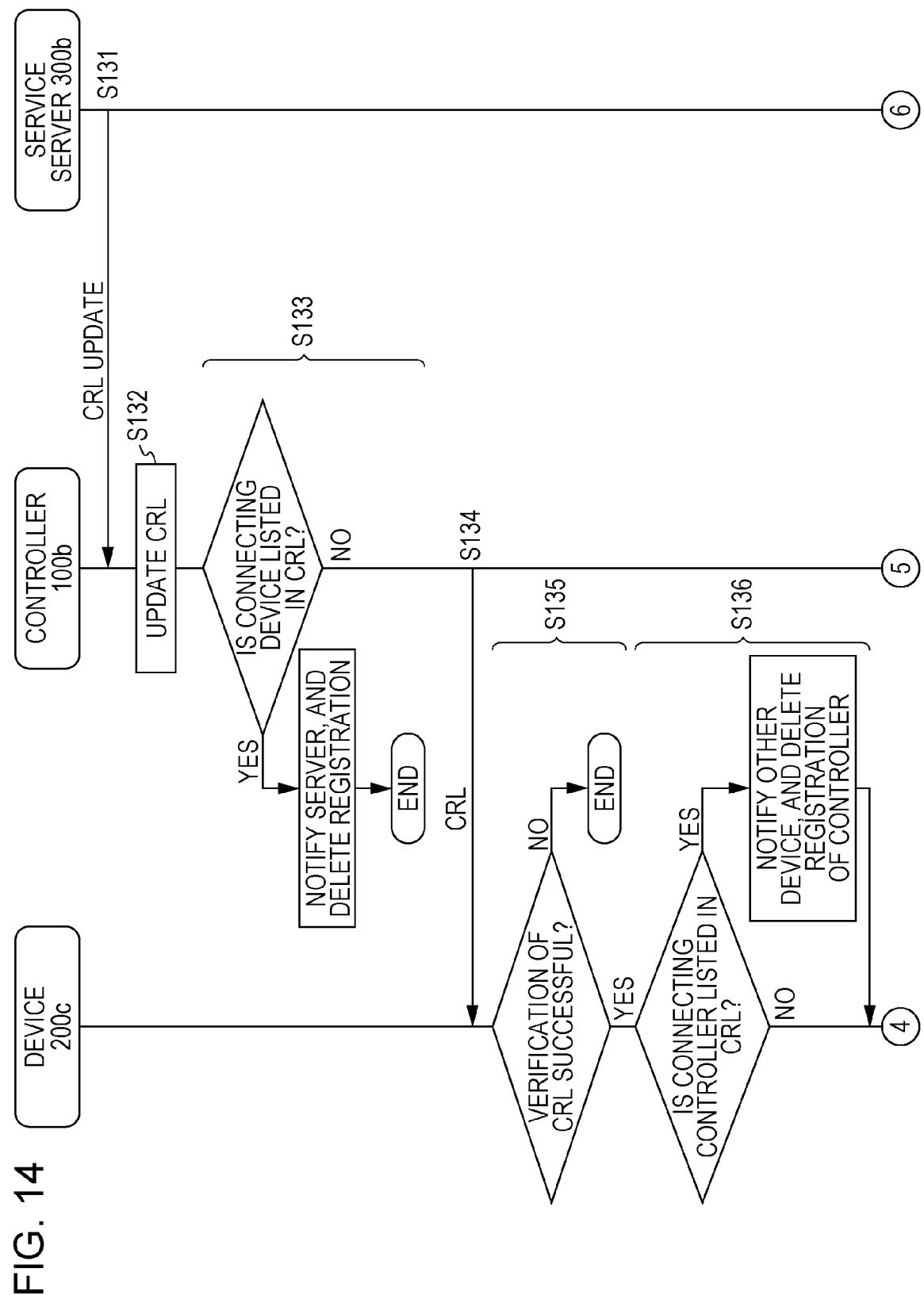
FIG. 14 is a sequence diagram for when updating a CRL of a device, according to the first embodiment.
Figure 15:
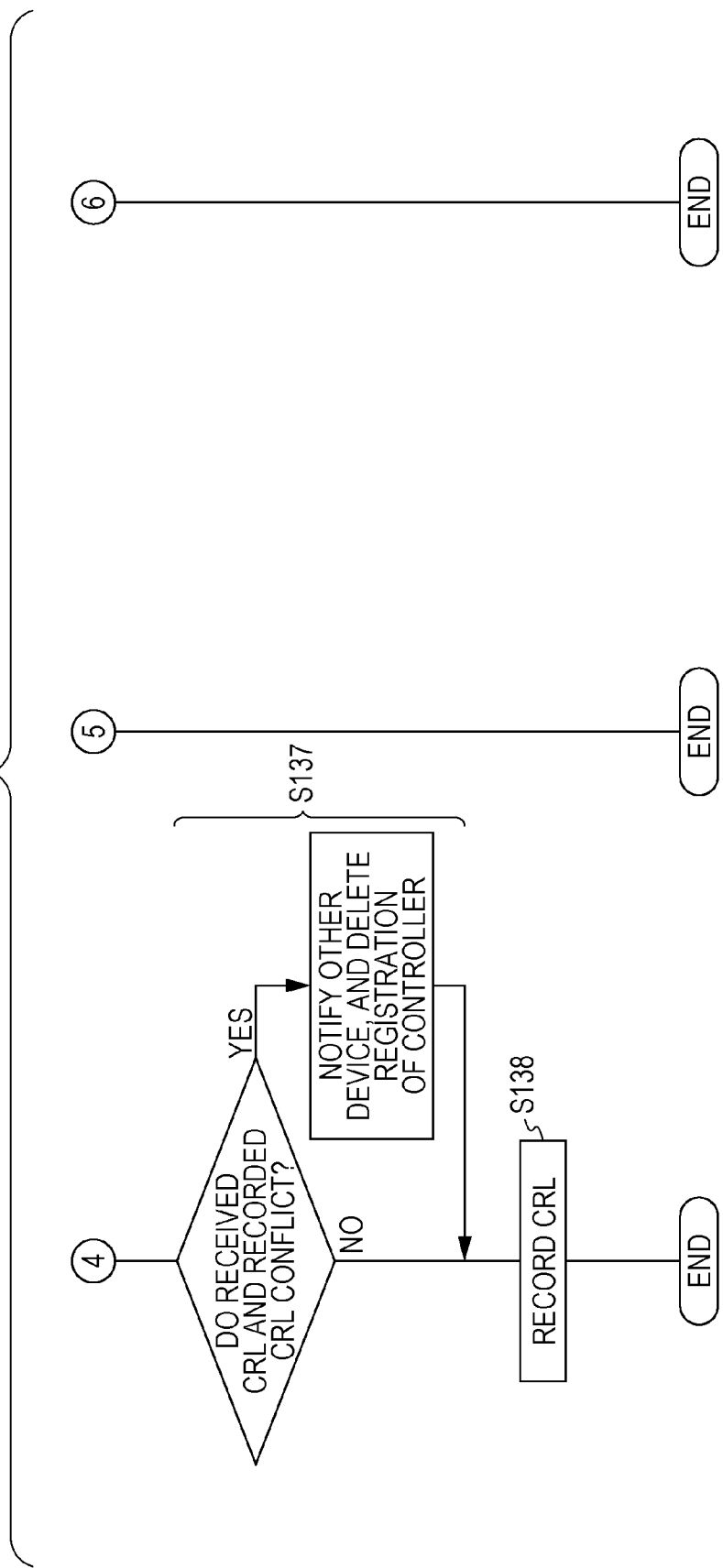
FIG. 15 is a sequence diagram for when updating a CRL of the device, according to the first embodiment.

FIGS. 14 and 15 illustrate a sequence to update the CRL of the device 200*c* from the controller 100*b*. Although an example of processing where the controller 100*b* updates the CRL of the device 200*c* will be described, the processing for updating the CRL of the device 200*c* from the controller 100*a* is the same.

In S131, after updating the CRL, the service server 300*b* requests the controller 100*b* for CRL updating processing along with the CRL.

In S132, the controller 100*b* updates to the CRL received from the service server 300*b*.

In S133, the controller 100*b* verifies whether a connecting device is listed in the CRL. If listed, this is notified to the service server 300*b*, and the registration of the listed device is deleted.

In S134, the controller 100*b* requests all connecting devices 200 for CRL updating processing along with the CRL. Description will be made here based on an example of requesting the device 200*c* to perform updating processing.

In S135, the device 200*c* verifies the signature of the received CRL. In a case where verification is not successful, the CRL updating processing ends.

In S136, the device 200*c* verifies whether or not any of the connecting controllers are listed in the CRL. If even one connecting controller is listed, the other devices and controllers are notified of detection of an unauthorized controller. Registration of this unauthorized controller is deleted from the connecting controller management table as well.

In S137, the device 200*c* compares the CRL received from the controller 100*b* and the CRL in the authentication information storage unit, and verifies whether or not there is inconsistency. Specifically, in a case where a CRL received from the controller 100*a* has been recorded, comparison is made between the issue date of the CRL received from the controller 100*b* and the next issue date of the CRL received from the controller 100*a*. In a case where the next issue date of the CRL received from the controller 100*a* is before the issue date of the CRL received from the controller 100*b*, determination is made that the next issue date of the CRL received from the controller 100*a* has passed, so the controller 100*a* is detected as an unauthorized controller since it did not update the CRL. Also, the versions of the CRLs received from the controller 100*a* and the controller 100*b* are compared, and if the CRL version does not match, the controller which transmitted the older version CRL is detected as an unauthorized controller since it did not update the CRL. At this time, the device 200*c* notifies the other devices and controllers of detection of an unauthorized controller. Registration of this unauthorized controller is deleted from the connecting controller management table as well. Connection with the controller 100*a* is also cut off.

In S138, the device 200*c* records the received CRL in the authentication information storage unit.

Figure 16:
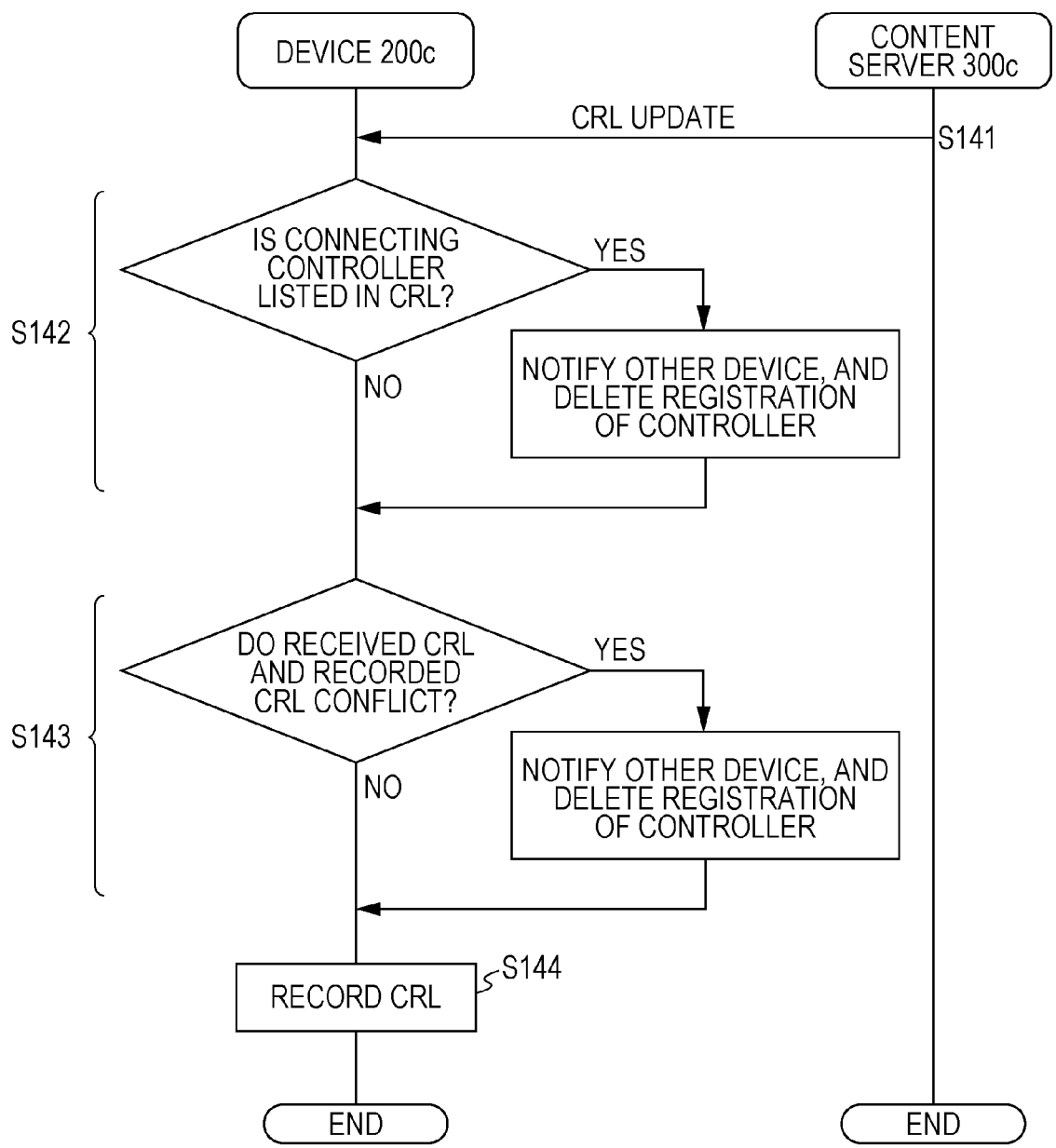
FIG. 16 is a sequence diagram for when updating a CRL of the device, according to the first embodiment.

FIG. 16 illustrates a sequence of the content server 300*c* updating the CRL of the device 200*c*. In S141, after updating the CRL, the content server 300*c* requests the device 200*a* for CRL updating processing along with the CRL.

In S142, the device 200*c* verifies whether or not any of the connecting controllers are listed in the CRL. If even one connecting controller is listed, the other devices, controllers, and content server 300*c* are notified of detection of an unauthorized controller. Registration of this unauthorized controller is deleted from the connecting controller management table as well.

S143 is the same as the processing S137 and thus description thereof will be omitted.

S144 is the same as the processing S138 and thus description thereof will be omitted.

1.7 Advantages of First Embodiment

A device which connects to one controller could not update the CRL if this controller is an unauthorized controller. In the first embodiment, the device receives CRLs from multiple controllers. Thus, the CRL can be acquired via multiple networks, and updating can be performed. Enabling updating of the CRL enables connection to unauthorized controllers to be prevented, and safe connection to be realized among authorized controllers and devices.

Second Embodiment

2. System Configuration

An authentication system 11 according to the present disclosure will be described here as an embodiment of the present disclosure, with reference to the drawings.

In the authentication system 11 according to a second embodiment, an encryption key of communication is shared between the controller and device after authentication, and history information of the device is transmitted to the server by encrypted communication.

2.1 Overall Configuration of Authentication System 11

The overall configuration of the authentication system 11 according to the second embodiment is the same as in the first embodiment, and accordingly description will be omitted here. Components having the same configuration as those in the first embodiment are denoted by the same reference numerals, and description will be omitted.

2.2 Operations of Authentication System 11

Operations of the authentication system 11 include the following.

(1) Device registration processing where connection is made from device to controller, and registration is made in server
(2) Processing to update CRL of manufacturer server 300a
(3) Processing to update CRL of device
(4) Processing to transmit device history information from device to server The processing of (2) and (3) is the same as in the first embodiment, so description will be omitted here. Each will be described below with reference to the drawings.

2.2.1 Operations at Time of Device Registration Processing

Figure 17:
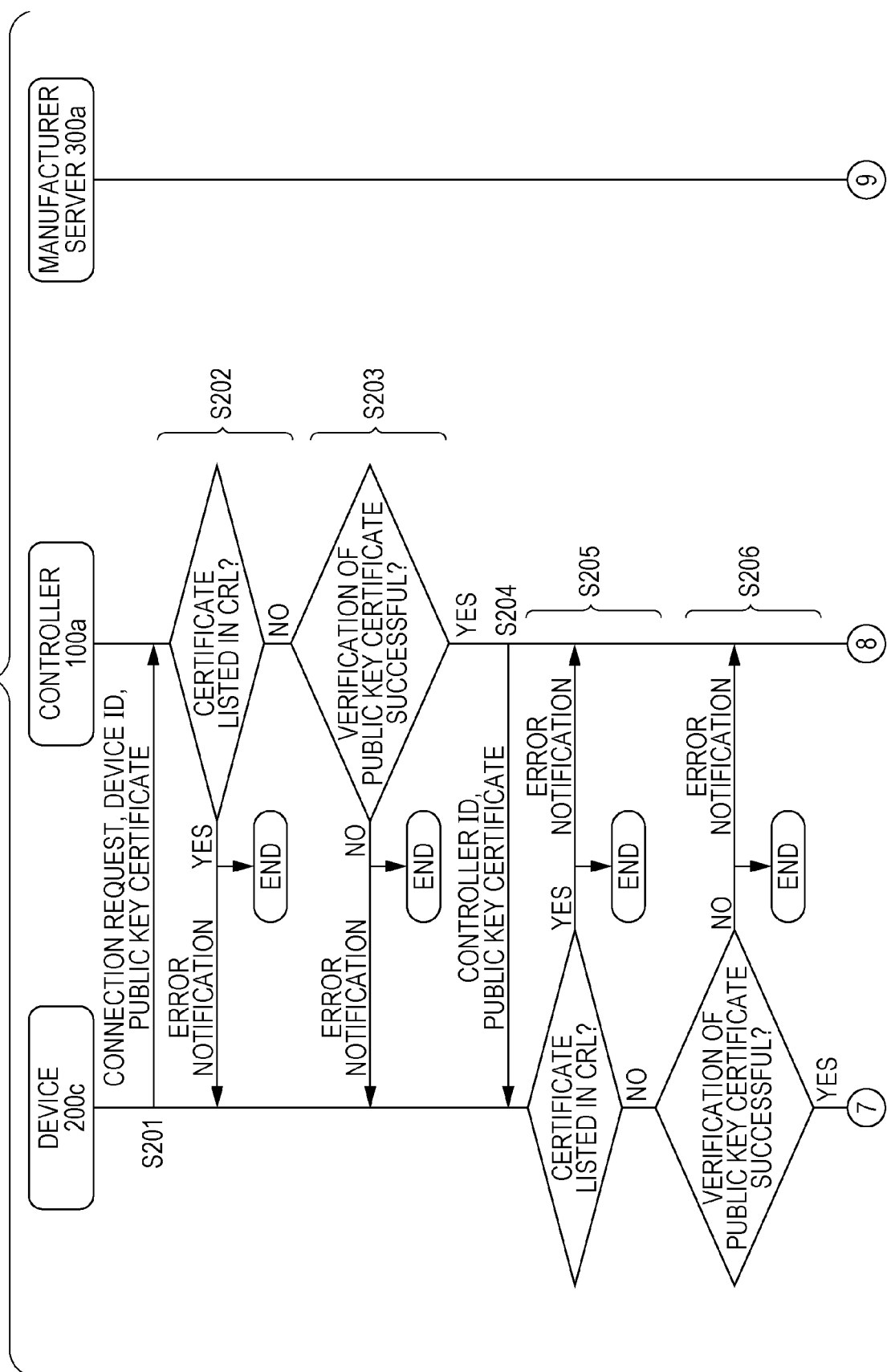
FIG. 17 is a sequence diagram for when registering a device, according to a second embodiment.
Figure 18:
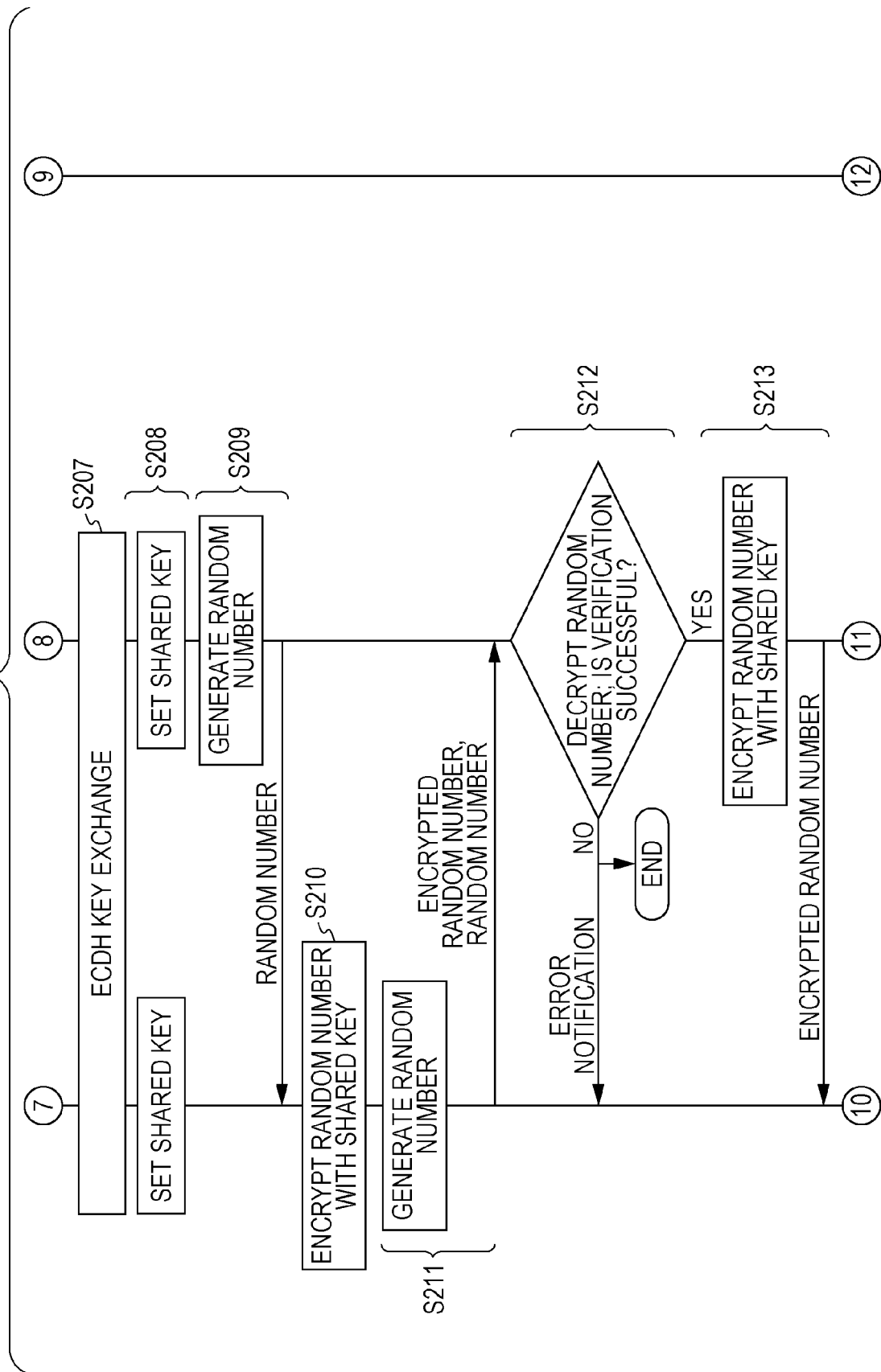
FIG. 18 is a sequence diagram for when registering the device, according to the second embodiment.
Figure 19:
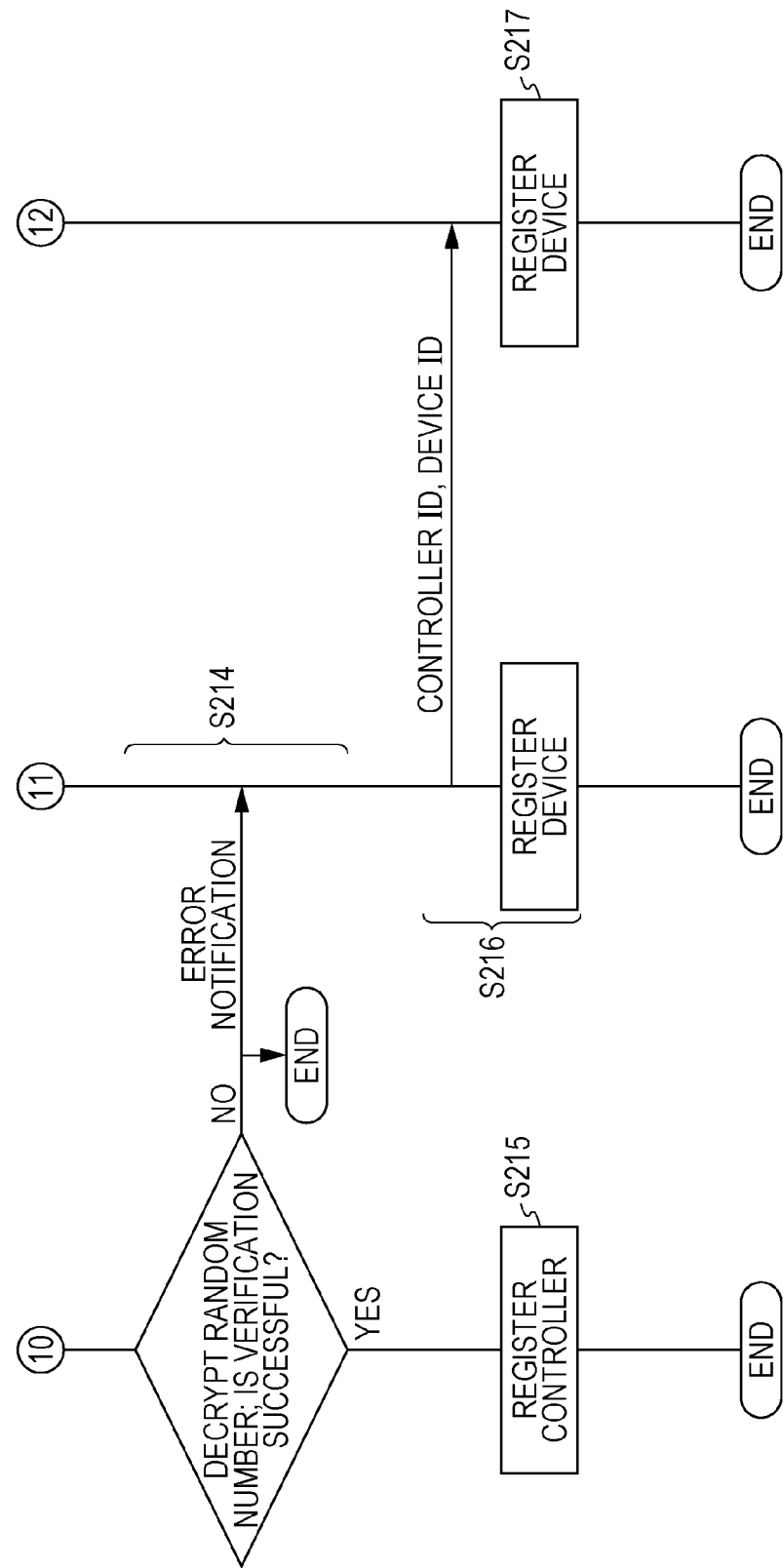
FIG. 19 is a sequence diagram for when registering the device, according to the second embodiment.

FIGS. 17 through 19 illustrate a sequence of processing where the device 200c connects to the controller 100a, and is registered to the manufacturer server. Processing where the device 200a or 200b connect to the controller 100a and are registered to the manufacturer server, and processing where the device 200c connects to the controller 100b, and is registered to the service server, are the same.

The processing in S201 through S203 is the same as the processing in S101 through S103 in the first embodiment, so description will be omitted here.

In S204, the controller 100a transmits the controller ID and public key certificate to the device 200c.

The processing in S205 through S206 is the same as the processing in S105 through S106, so description will be omitted here.

In S207, the device 200c and controller 100a exchange keys. Elliptic curve Diffie-Hellman (ECDH), which is an elliptic curve cryptography key exchange method, is used here.

ECDH is described in "Elaine Barker, three others, NIST Special Publication 800-56A Revision 2, 'Recommendation for Pair-Wise Key-Establishment Schemes Using Discrete Logarithm Cryptography', [online], May 13, 2013, National Institute of Standards and Technology, [Searched Jun. 24, 2014], Internet <URL: http://nvlpubs.nist.gov/nistpubs/SpecialPublications/NIST.SP.800-56Ar2.pdf>", and accordingly will not be described here.

In S208, the device 200c and controller 100a set the key shared in the key exchange as a shared key.

In S209, the controller 100a generates a random number, and transmits to the device 200c.

In S210, the device 200c receives the random number from the controller 100a, and encrypts using the shared key.

In S211, the device 200c generates a random number, and transmits to the controller 100a along with the encrypted random number generated in S210.

In S212, the controller 100a receives the encrypted random number and the random number, decrypts the encrypted random number using the shared key, and verifies whether it matches the random number generated in S209. In a case where verification fails, an error is notified to the device 200c and the processing ends.

In S213, in a case where verification is successful in S212, the controller 100a uses the shared key to encrypt the random number received in S212, and transmits the encrypted random number to the device 200c.

In S214, the device 200c receives the encrypted random number, decrypts the encrypted random number using the shared key, and verifies whether it matches the random number generated in S211. In a case where verification fails, an error is notified to the controller 100a and the processing ends.

In S215, in a case where verification is successful in S214, the device 200c registers the controller 100a in the connecting controller management table. FIG. 20 is a connecting controller management table according to the second embodiment, configured including the shared key shared with the controller, in addition to the connecting controller management table according to the first embodiment.

In S216, the controller 100a transmits the controller ID and certificate ID of the public key certificate, and the device ID of the device regarding which verification was successful in S212 and the certificate ID of the public key certificate, to the manufacturer server 300a, and registers the device ID of the device and the certificate ID of the public key certificate in the connecting device management table. FIG. 21 is a connecting device management table according to the second embodiment, configured including the shared key shared with the device, in addition to the connecting device management table according to the first embodiment.

The processing in S217 is the same as the processing in S114 in the first embodiment, so description will be omitted here.

Figure 22:
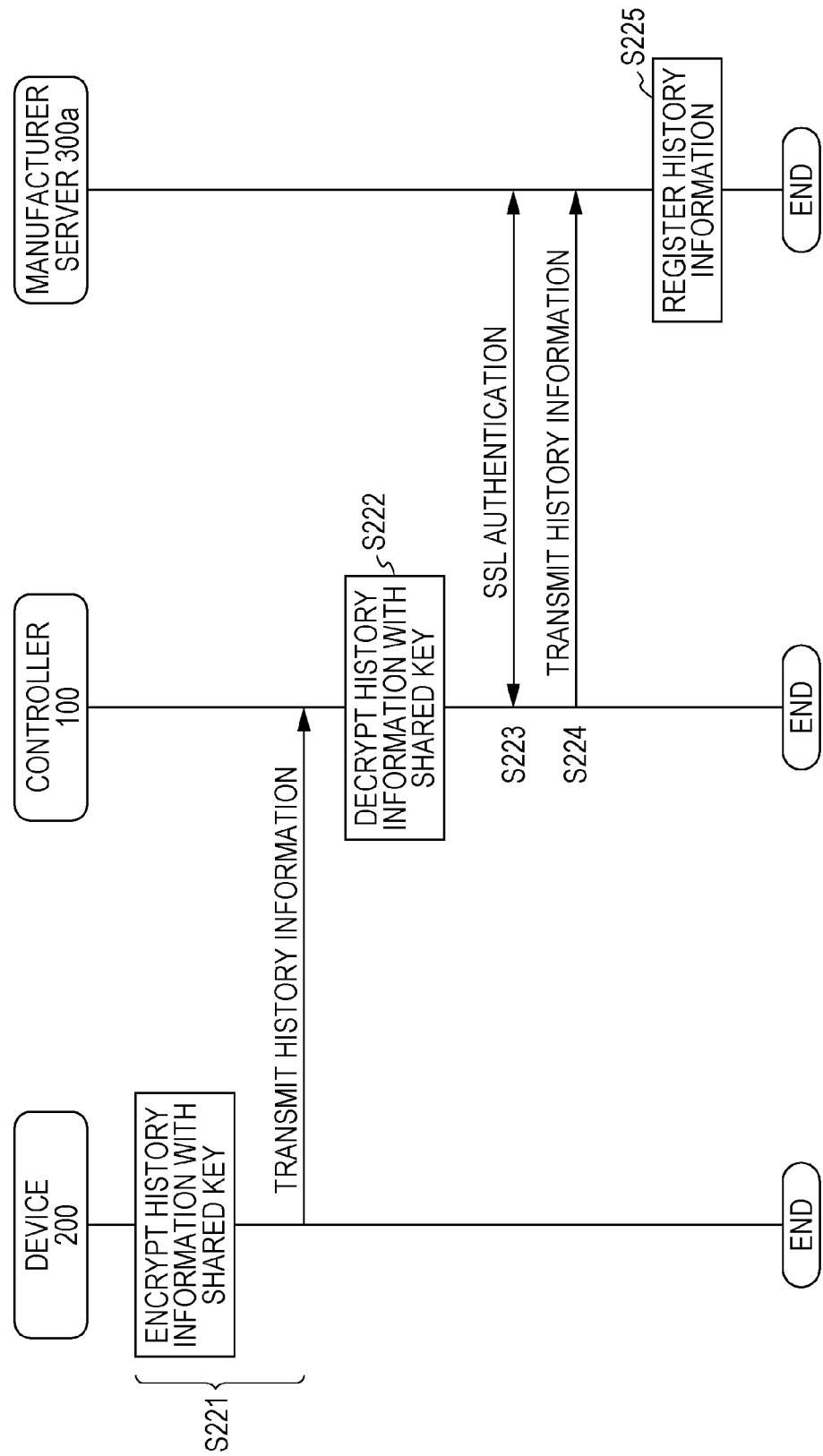
FIG. 22 is a sequence diagram for when performing transmission processing of device history information according to the second embodiment.

2.2.2 Operations Processing for Transmitting Device History Information from Device to Manufacturer Server 300a FIG. 22 illustrates a sequence of transmitting device history information from the device to the manufacturer server 300a. This uploading is performed periodically or non-periodically.

In S221, the device encrypts accumulated device history information using the shared key, and transmits to the controller along with the device ID.

In S222, the controller receives the device ID and encrypted device history information, searches for the shared key based on the device ID, and decrypts the device history information using the shared key.

In S223, the controller and manufacturer server 300a perform SSL authentication, and establish an encrypted communication path.

In S224, the controller transmits the controller ID and device ID received from the device and the device history information to the manufacturer server 300a.

In S225, the manufacturer server 300a registers the received controller ID, device ID, and device history information.

2.3 Advantages of Second Embodiment

Key exchange is performed when authenticating the device, and the shared key is used for challenge-response authentication in the second embodiment. The shared key can be generated from just the public key corresponding to the secret key, so if a device does not have the secret key corresponding to the public key of the public key certificate, the shared key cannot be generated, and challenge-response authentication will fail. Accordingly, authentication processing can be reduced as compared to authentication processing where signature generation using the secret key and signature verification using the public key are performed. Encrypted communication of the device history information can be performed by the shared key, so leakage of device history information can be prevented.

Third Embodiment

3. System Configuration

Here, an authentication system 10a according to the present disclosure will be described as an embodiment of the present disclosure, with reference to the drawings. At the time of updating the CRL of a device connected to an unauthorized controller in the first embodiment, the device updates the CRL via an authorized controller to which the device is separately connected, thereby preventing connection to the unauthorized controller. At this time, the device which has updated the CRL can detect other devices connecting to the unauthorized controller, and can notify the detected other devices of detection of the unauthorized controller.

However, in a case where a CRL listing certificate IDs of public key certificates of controllers and devices with no devices connected is recorded each time a CRL is updated, the device storage capacity will be exceeded if small, so the CRL that is actually necessary may not be able to be stored in the authentication information storage unit.

In the third embodiment, devices with small storage capacity only hold the minimally necessary CRLs, and devices with large storage capacity, such as having a hard disk (HDD), hold all issued CRLs. Accordingly, a device with large storage capacity detects other devices connected to the controller to which the device with large storage capacity is connected, and determines whether or not to transmit a CRL in accordance with the storage capacity of the devices that have been detected. Devices with large storage capacity have a connecting device management table sorted by controller, and determine the storage capacity of each device. The connecting device management table sorted by controller will be described in detail in 3.1.

3.1 Overall Configuration of Authentication System 10a

The overall configuration of the authentication system 10a according to the third embodiment is the same as the first embodiment, so overall description will be omitted. Note that the device 200a and device 200b are devices with small storage capacity, and the device 200c is a device with a large storage capacity, such as having an HDD. An example of a device 200c that has a large storage capacity and that connects to the service server 300b via the controller 100b is a recorder.

In the third embodiment, the connecting device management table sorted by controller is added to the device information which the device information storage unit 203 within the device 200c according to the first embodiment holds. The connecting device management table sorted by controller is created by the device itself when the device connects to the controller, and is stored in the device information storage unit.

FIG. 36 illustrates an example of a connecting device management table sorted by controller. The connecting device management table sorted by controller is configured including controller ID, device ID, and storage capacity. The controller ID of the controllers to which the device holding the table is connected are listed in the column for the controller ID. The device ID of the device to which each controller is connected is listed in the column for the device ID. The magnitude of the storage capacity of each device is listed in the column for the storage capacity. At the time of detecting devices, the device compiling the table determines the magnitude of storage capacity. Examples of methods to determine include the detected device transmitting its storage capacity to the device compiling the table, or transmitting whether or not it has an HDD. In the case of the former, determination is made regarding whether or not the storage capacity is greater than a preset threshold value. In the present embodiment, the controller 100a and controller 100b connected to the device 200c are listed. The device 200a and device 200b are listed as being connected to the controller 100a, with the storage capacity of the device 200a and device 200b being small. Nothing is connected to the controller 100b other than the device 200c, so NULL is recorded for both the device ID and storage capacity.

An instance where the portal server 400 issues one CRL per certificate ID1 will be described here.

3.2 Operations of Authentication System 10a

In the same way as with the first embodiment, the operations of the authentication system 10a include the following.

(1) Device registration processing where connection is made from device to controller, and registration is made in server
(2) Processing to update CRL of manufacturer server 300a
(3) Processing to update CRL of device The processing of (2) is the same as the first embodiment, so description will be omitted. (1) and (3) will be described below with reference to the drawings.

3.2.1 Operations at Time of Device Registration Processing

Operations of registering the connecting device management table sorted by controller are added to the operations of the second embodiment in the operations at the time of device registration processing according to the present embodiment.

A sequence of processing where the device 200c connects to the controller 100a and is registered to the manufacturer server 300a is illustrated here. Processing where the device 200c connects to the controller 100b and is registered to the service server 300b is the same.

The sequence is the same as FIGS. 17 through 19, so details of processing added to S215 will be excerpted and described in the present embodiment.

Figure 40:
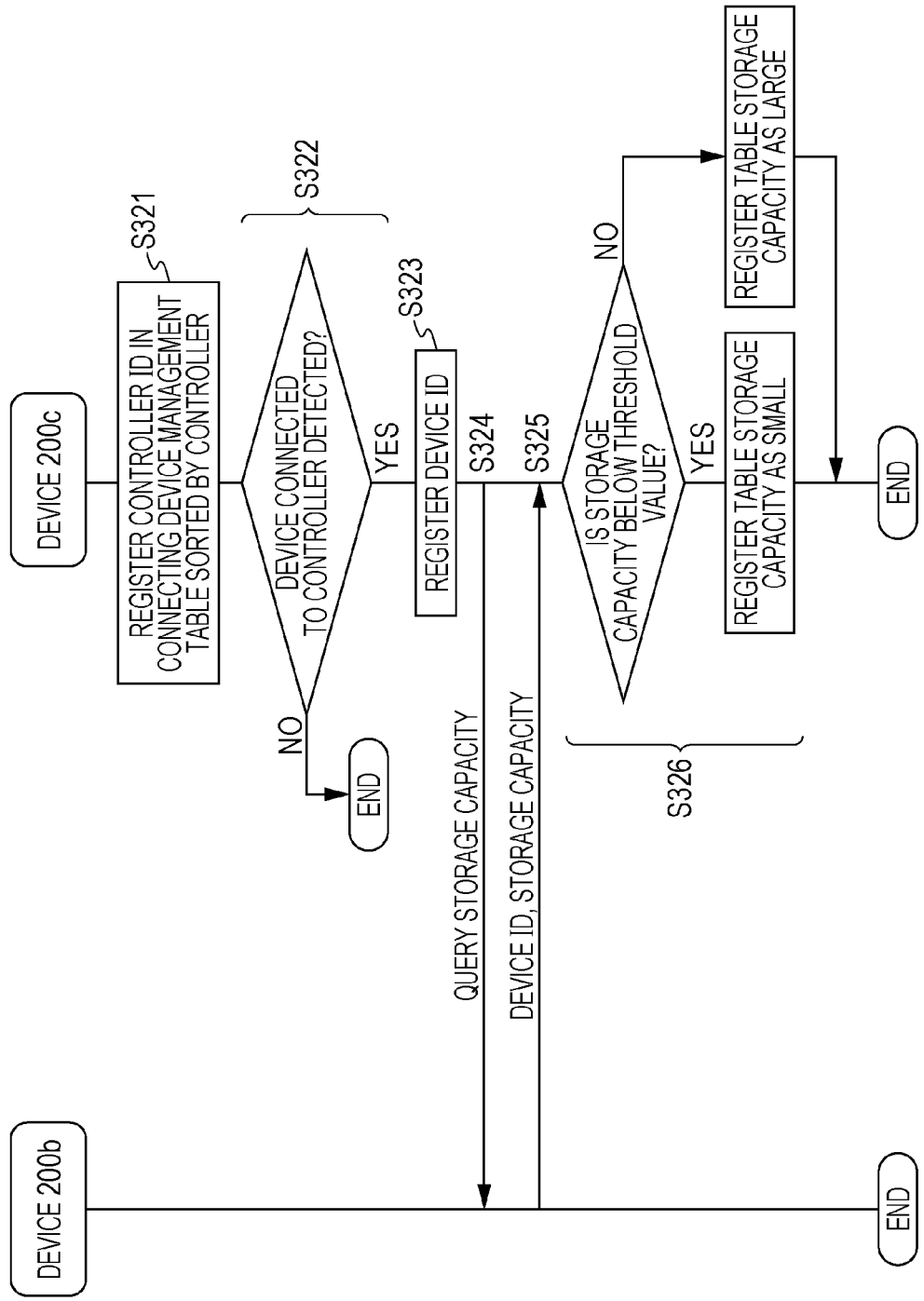
FIG. 40 is a sequence diagram of controller registration processing for when registering a device in the third embodiment.

FIG. 40 illustrates a sequence after the device having registered a controller to the connecting controller management table at the time of device registration. Description will be made here regarding an example of processing in which the device 200c detects other devices connected to the controller 100a at the time of performing device registration with the controller 100a, and registers the device IDs of the detected devices in the row of the controller 100a.

In S321, upon registering the controller in the connecting controller management table, the device 200c registers the controller ID registered in the connecting controller management table to the connecting device management table sorted by controller. Here, the device 200c registers the controller ID of the controller 100a.

In S322, the device 200c detects the devices connected to the controller of the controller ID registered in S321. If nothing is detected, the controller registration processing ends.

In S323, the device 200c registers the controller ID and the device ID of the device detected in S322 in the connecting device management table sorted by controller.

In S324, the device 200c transmits a query for storage capacity to the device of the device ID registered in the connecting device management table sorted by controller.

In S325, the device which has received the query for storage capacity transmits the device ID and storage capacity to the device 200c upon having received the query for storage capacity.

In S326, the device 200c confirms whether the storage capacity received in S325 is smaller than a preset threshold value. If smaller than the preset threshold value, small is registered in the row of the connecting device management table sorted by controller matching the controller ID and device ID received in S325. If equal to or greater than the threshold value, the storage capacity is registered as large. The threshold value is, for example, "two or more CRLs". That is to say, the storage capacity is registered as being large if the device can hold two or more CRLs, and otherwise the storage capacity is registered as being small.

3.2.2 Operations of Processing to Update CRL of Device

For operations of processing to update the CRL of the device, an example will be described in the present embodiment regarding processing where a CRL is transmitted from the device 200c to the device 200b, and registration of an unauthorized controller 100a is deleted. The processing for the device 200a connected to the controller 100a is the same as that for the device 200b.

Figure 35:
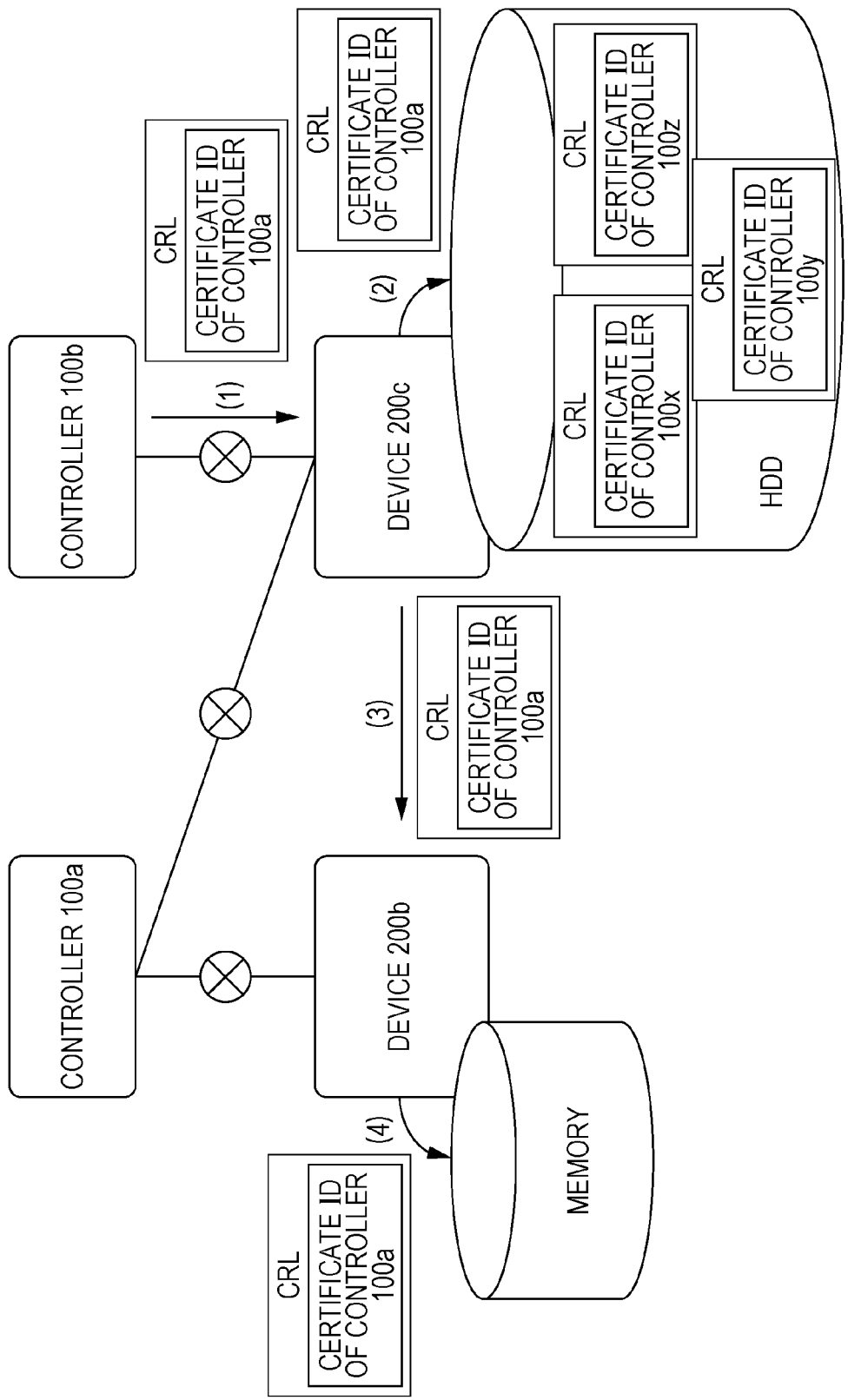
FIG. 35 is a conceptual diagram of processing of transmitting a CRL from one device to another device for when updating the CRL of a device according to the third embodiment.

FIG. 35 is a conceptual diagram of processing for transmitting a CRL from the device 200c to the device 200b. The device 200c which has a large storage capacity records all CRLs received from the controller 100b. On the other hand, the device 200b which has the small storage capacity cannot record all CRLs, and accordingly only records a CRL received from the device 200c.

Upon receiving a CRL listing the certificate ID of the public key certificate of the controller 100a, the device 200c detects the device 200b connected to the controller 100a, and transmits the CRL thereto.

(1) The device 200c receives, from the controller 100b, the CRL listing the certificate ID of the public key certificate of the controller 100a.

(2) The device 200c stores the CRL listing the certificate ID of the public key certificate of the controller 100a in the HDD.

(3) The device 200c detects the device 200b with the small storage that is connected to the common controller, and if that controller is the controller 100a, transmits the CRL to the device 200b.

(4) The device 200b stores the CRL listing the certificate ID of the public key certificate of the controller 100a in the memory.

Thus, in addition to the CRL listing the certificate ID of the public key certificate of the connecting controller 100a, the device 200c holds a CRL listing certificate IDs of the public key certificates of a controller 100x, controller 100y, and controller 100z. On the other hand, the device 200b only holds the CRL listing the certificate ID of the public key certificate of the connecting controller 100a.

Figure 23:
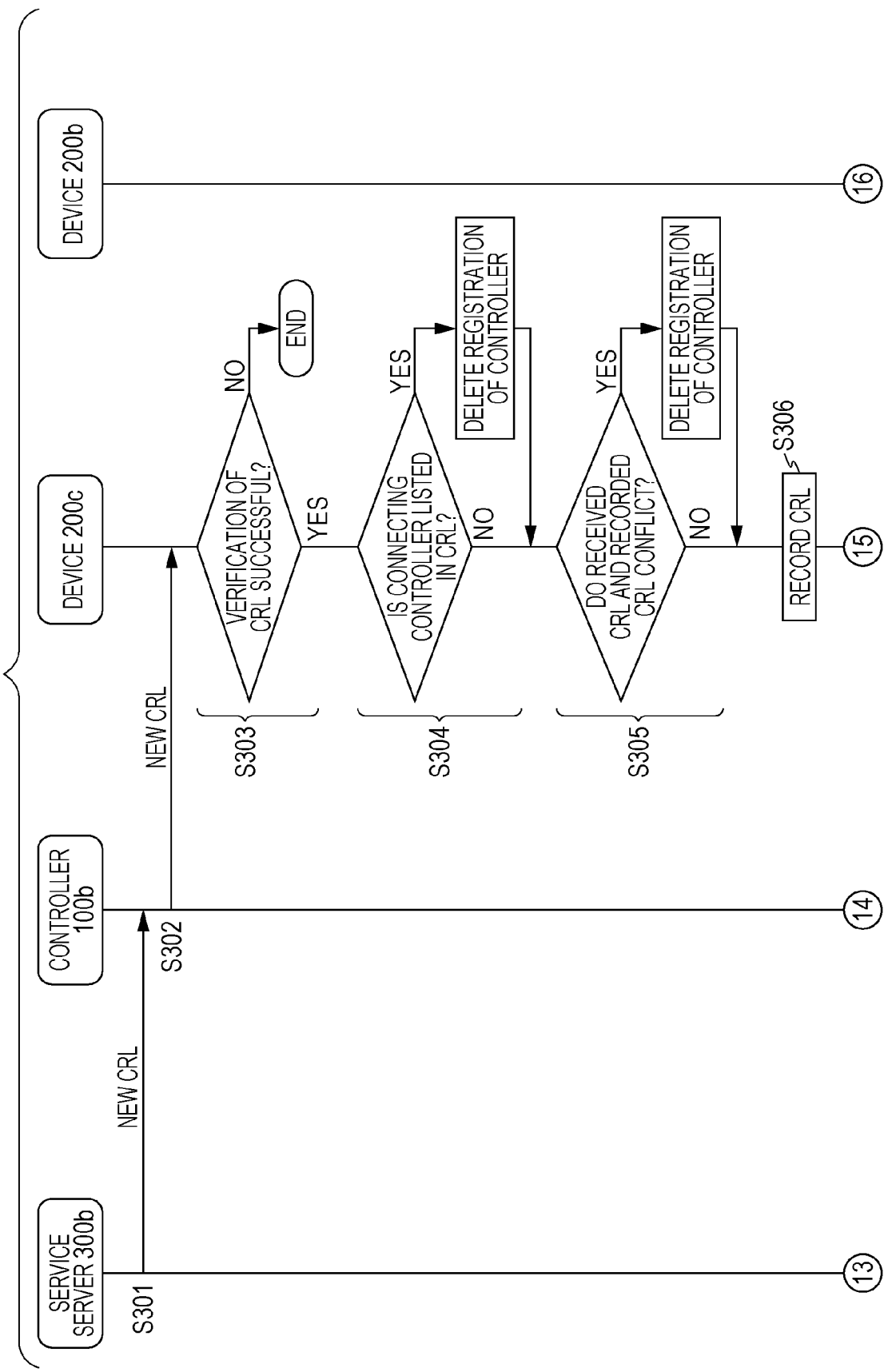
FIG. 23 is a sequence diagram for when updating the CRL of a device according to the third embodiment.
Figure 24:
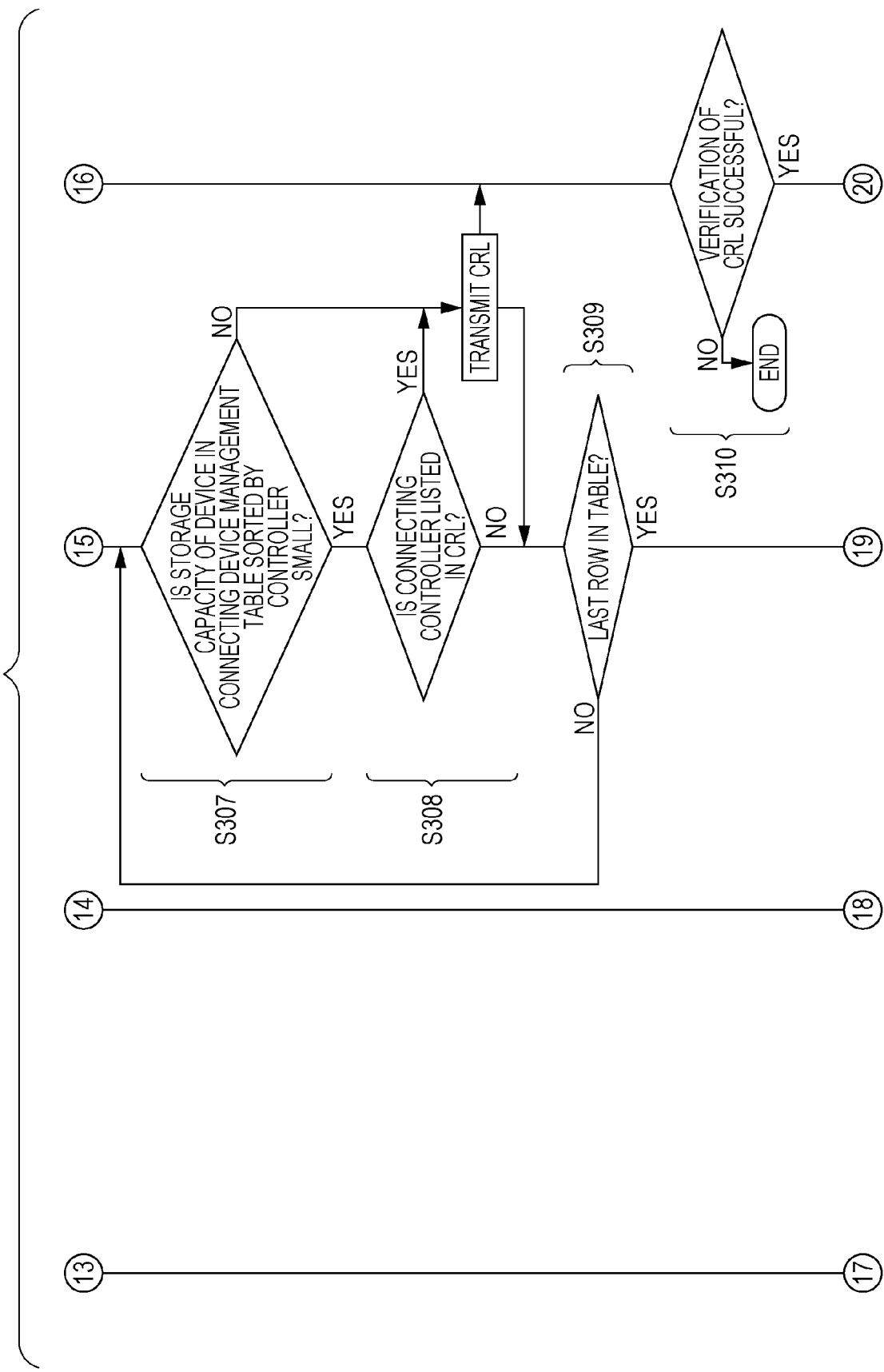
FIG. 24 is a sequence diagram for when updating the CRL of a device according to the third embodiment.
Figure 25:
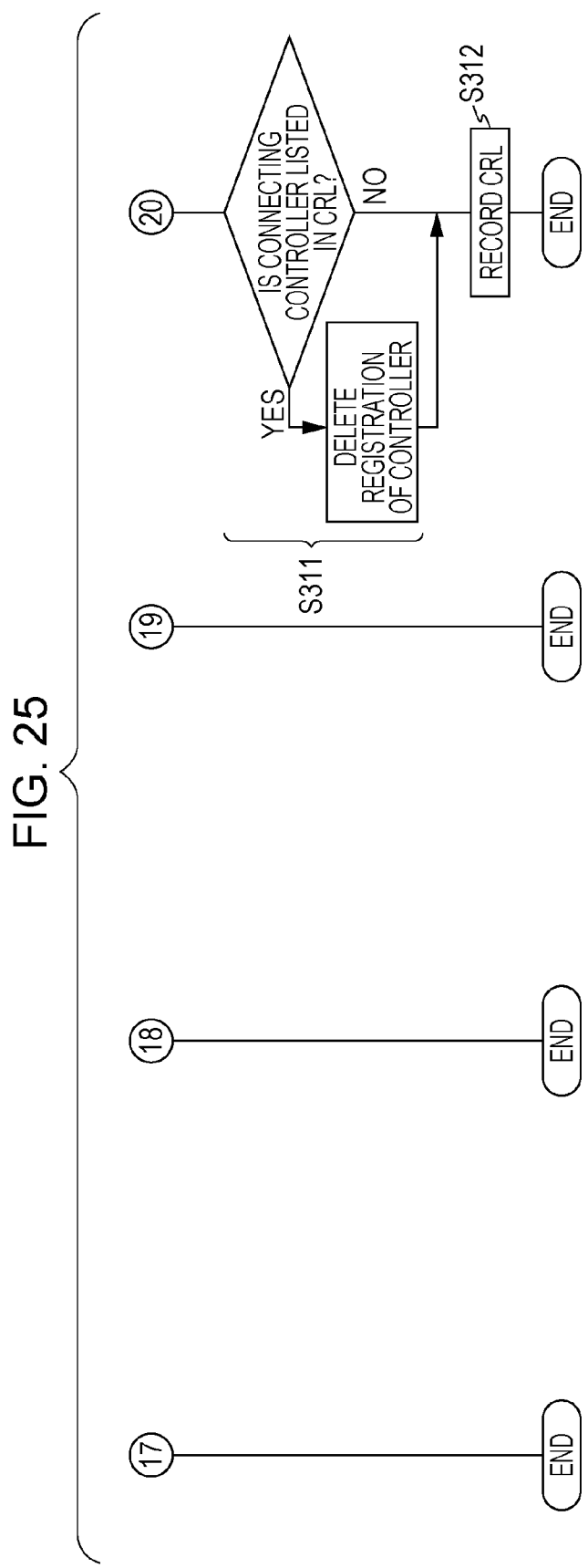
FIG. 25 is a sequence diagram for when updating the CRL of a device according to the third embodiment.

A sequence of processing where the device 200c connects to the controller 100b connected to the service server 300b, and updates the CRL within the device 200c and the CRL within the device 200b at the time of receiving the CRL from the controller 100b, will be described below with reference to FIGS. 23 through 25.

In S301, the service server 300b transmits a newly-issued CRL (hereinafter, new CRL) to the controller 100b. Here, this is the CRL listing the certificate ID of the public key certificate of the controller 100a.

In S302, the controller 100b transmits the new CRL received from the service server 300b to the device 200c. Here, in a case where the controller 100b records the CRL received in S301, processing the same as S132 through S133 in the first embodiment is performed.

In S303, the device 200c verifies the signature of the CRL received from the controller 100b. If verification is not successful, the CRL updating processing ends.

In S304, the device 200c verifies whether or not any of the connecting controllers are listed in the CRL. If even one connecting controller is listed, registration of this unauthorized controller is deleted from the connecting controller management table. Here, registration of the controller 100a is deleted.

In S305, the device 200c compares the CRL received from the controller 100b and the CRL in the authentication information storage unit, and verifies whether or not there is inconsistency. In a case where there is inconsistency, registration of the controller which is the distribution source of the CRL with inconsistency is deleted from the connecting controller management table. The registration of the controller 100a is deleted here. Connection with the controller 100a is also cut off.

In S306, the device 200c records the CRL received from the controller 100b.

In S307, the device 200c references the connecting device management table sorted by controller, and confirms the storage capacity of the devices starting from the first row. If the subject device is a device with a large storage capacity, the device 200c transmits the new CRL to the subject device.

In S308, in a case where the subject device is a device with a small storage capacity, the device 200c verifies whether or not the controller to which the subject device is connected is listed in the CRL. At this time, the device 200c first references the connecting device management table sorted by controller, and extracts the controller ID of the controller to which the subject device connects. Next, the device 200c references the connecting controller management table, and extracts the certificate ID of the public key certificate of the controller corresponding to the extracted controller ID. The device 200c then verifies whether or not the extracted certificate ID is listed in the CRL. In a case where the connecting controller is listed in the CRL, the device 200c transmits a new CRL to the subject device. In a case where the connecting controller is not listed in the CRL, the device 200c does not transmit the new CRL to the subject device. Here, the new CRL is transmitted to the device 200b which is a device with a small storage capacity and of which the connecting controller is the controller 100a listed in the CRL.

In S309, the device 200c confirms whether or not the subject device is the last row in the table. If not the last row, the processing of S307 through S309 is performed with the device in the next row as the subject device. If the final row, the CRL updating processing ends.

In S310, the device 200b verifies the signature of the CRL received from the device 200c. If the verification fails, the CRL updating processing ends.

In S311, the device 200b verifies whether or not any of the connecting controllers are listed in the CRL. If even one connecting controller is listed, registration of this unauthorized controller is deleted from the connecting controller management table. Here, registration of the controller 100a is deleted.

In S312, the device 200b records the CRL received from the device 200c. In a case where the device 200c is a television or recorder, the device 200b may transmit that the CRL has been recorded as a CRL update completion notification to the device 200c, and the device 200c may make a display to that effect on a display. For example, when the user turns on the power to a television, the television displays that the CRLs of devices connecting to the same controller have been updated.

3.3 Advantages of Third Embodiment

In the third embodiment, when a device having a large storage capacity receives a new CRL, this device detects other devices connected to the controller to which it is connected, and determines whether or not to transmit the new CRL according to the magnitude of the storage capacity of the detected devices. Accordingly, devices with small storage capacity can receive and store a minimally necessary CRL listing the certificate ID of the public key certificate of the controller to which it is connected, thereby preventing connection to an unauthorized controller.

Fourth Embodiment
4. System Configuration

Here, an authentication system 10b according to the present disclosure will be described as an embodiment of the present disclosure, with reference to the drawings. In the third embodiment, when a device with a large storage capacity receives a new CRL, other devices connected to the controller to which this device is connected are detected, and whether or not to transmit the CRL is determined according to the magnitude of the storage capacity of the detected devices.

However, in a case of a CRL listing a certificate ID of a public key certificate of a controller to which there are no devices with large storage capacity connected, there is no way to know whether another device is connected to the controller having the public key certificate of the certificate ID listed in the CRL. Accordingly, the state continues where the device connected to the controller having the public key certificate of the certificate ID listed in the CRL remains connected to an unauthorized controller.

In the fourth embodiment, at the time of a device with a large storage capacity receiving a new CRL, the device with a large storage capacity checks with a device with a small storage capacity regarding the certificate ID of the public key certificate of a controller other than the controller to which connection is being made in common, and if the certificate ID is listed in the CRL, the device with a large storage capacity transmits the CRL. Further, the device with a small storage capacity that has received the CRL transmits the CRL to other devices connected to the unauthorized controller.

An example where the storage capacity of a controller is small and multiple CRLs cannot be held will be described in the fourth embodiment. The controller holds only the minimally necessary CRL where the certificate IDs of the public key certificates of the devices are listed. A controller connected to a device with a large storage capacity transmits CRLS, including the CRL it holds, to the device with a large storage capacity. In a case where the storage capacity of the controller is sufficient, the controller may hold all CRLs and the controller directly transmit the CRLs to the devices. However, not all controllers have large storage capacity, so the usage case of the configuration described in the present embodiment will be described.

4.1 Overall Configuration of Authentication System 10b

Figure 26:
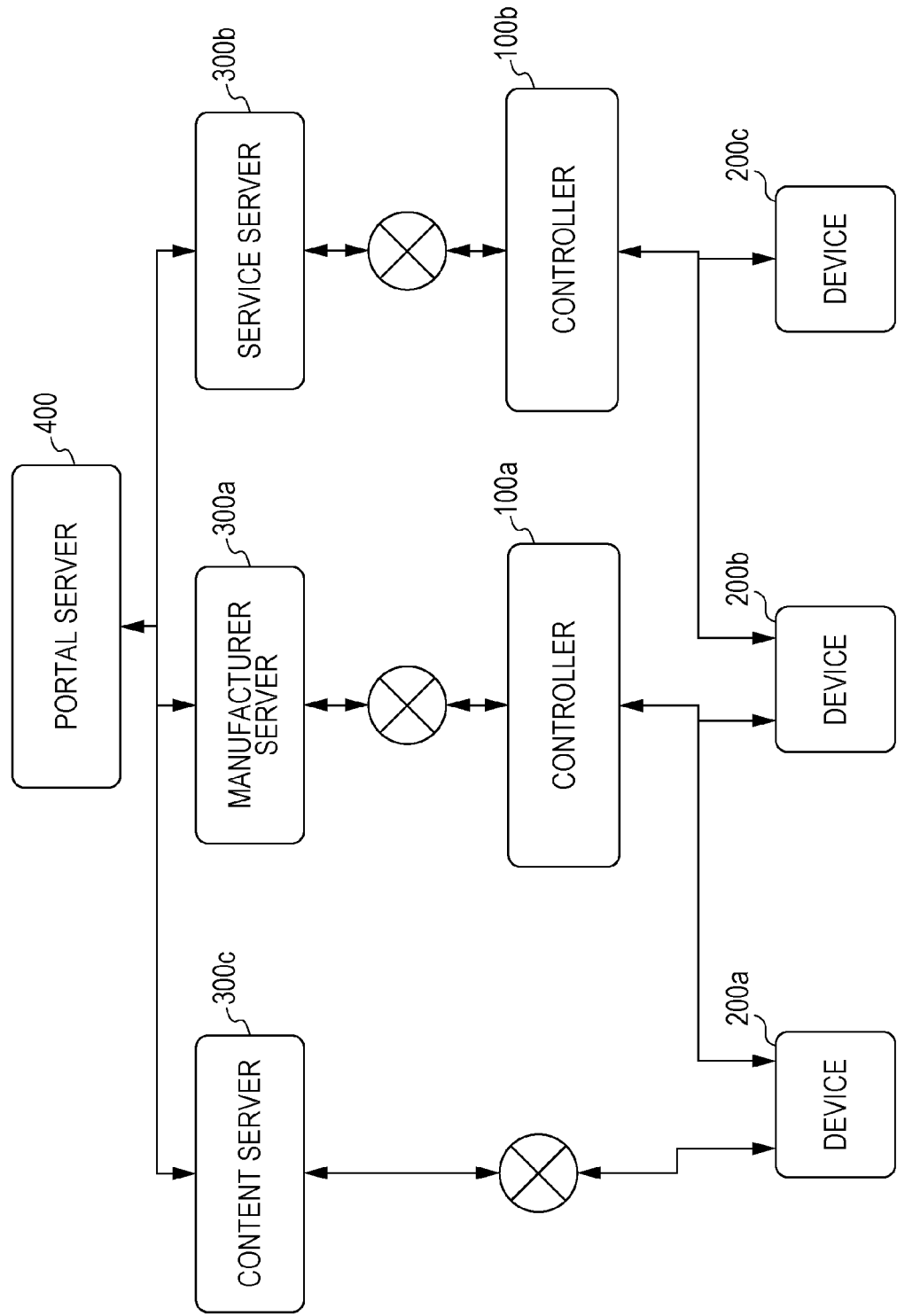
FIG. 26 is an overall configuration diagram of an authentication system according to a fourth embodiment.
Figure 27:
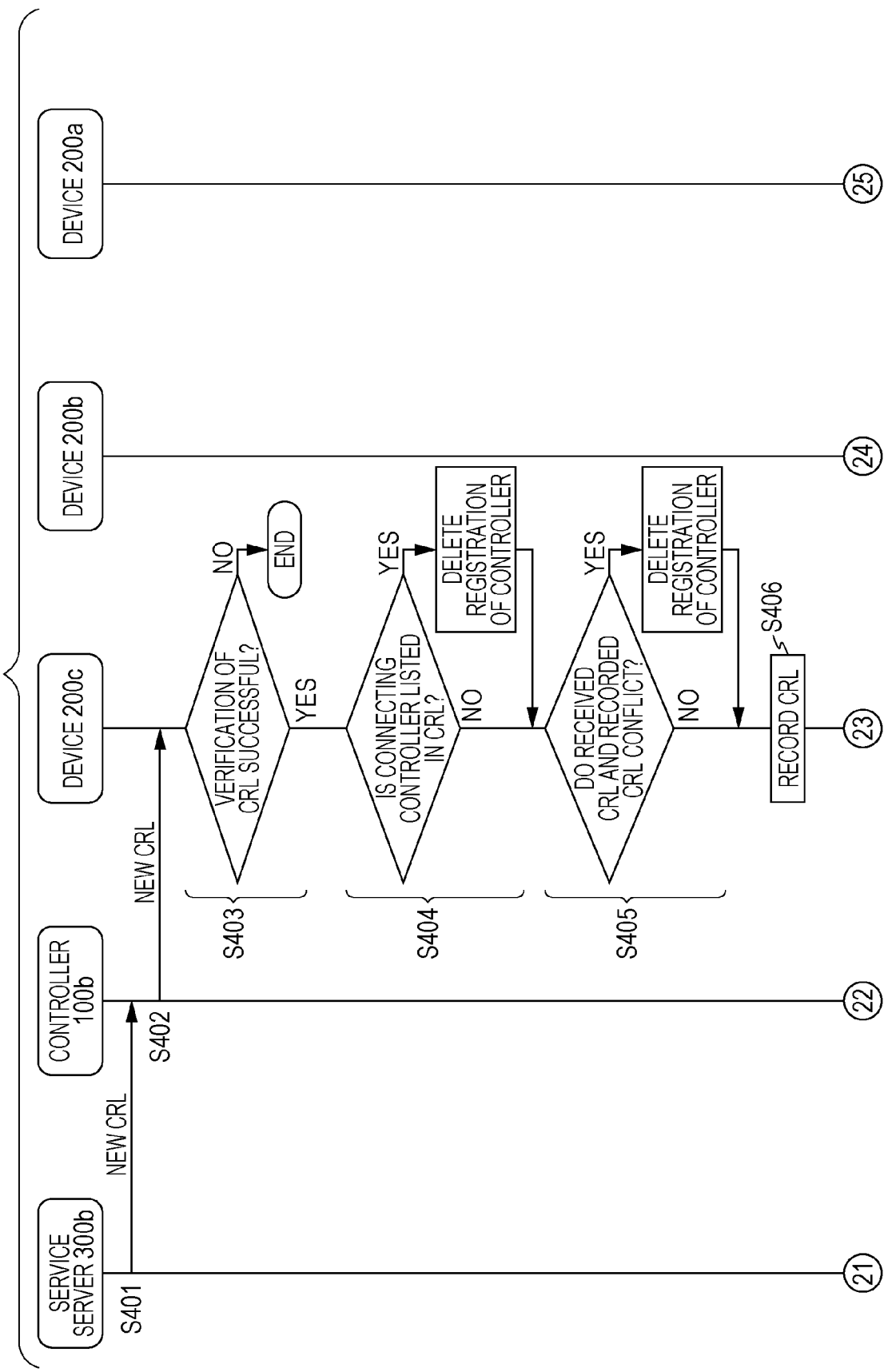
FIG. 27 is a sequence diagram for when updating the CRL of a device according to the fourth embodiment.
Figure 28:
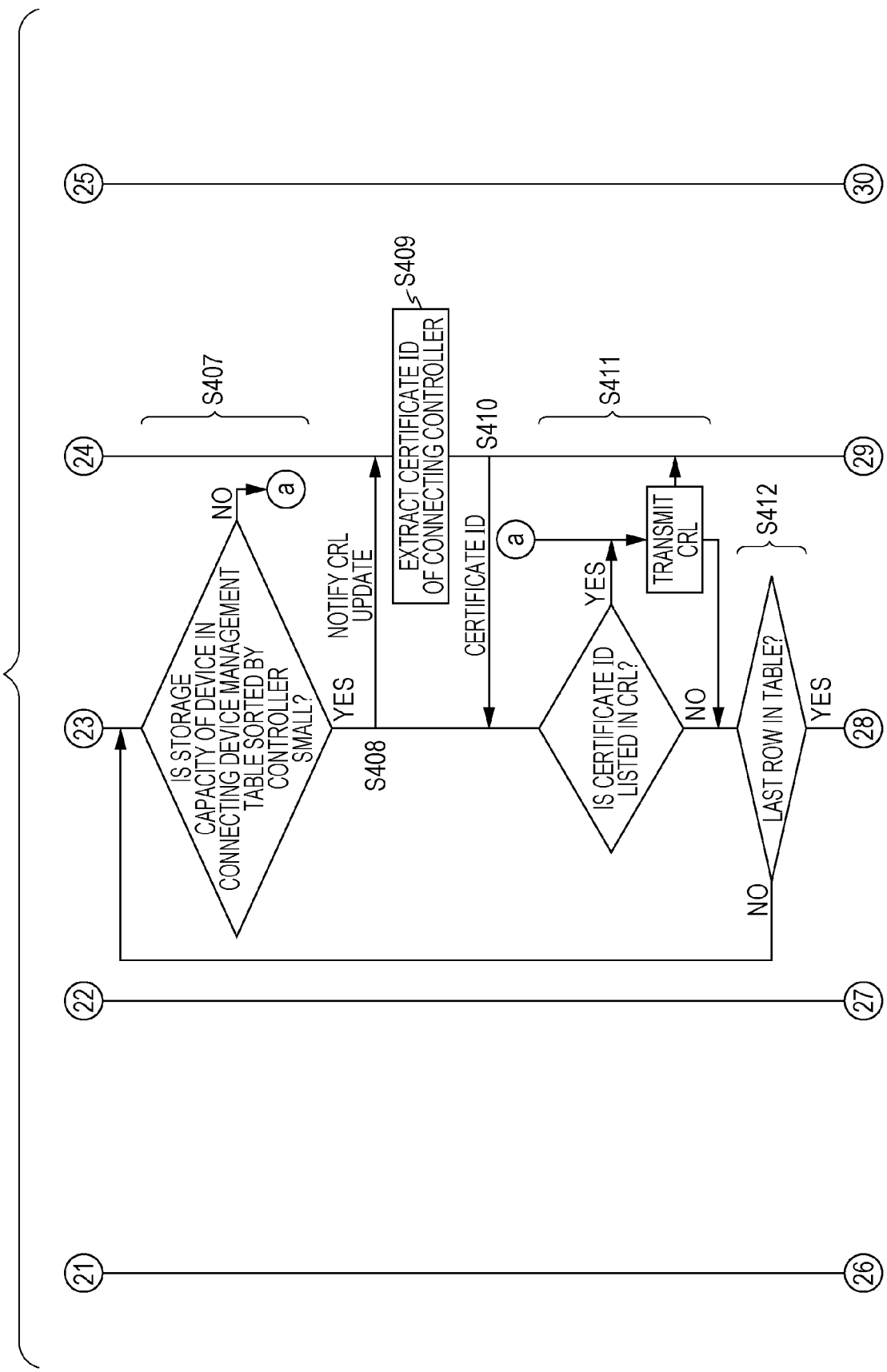
FIG. 28 is a sequence diagram for when updating the CRL of a device according to the fourth embodiment.
Figure 29:
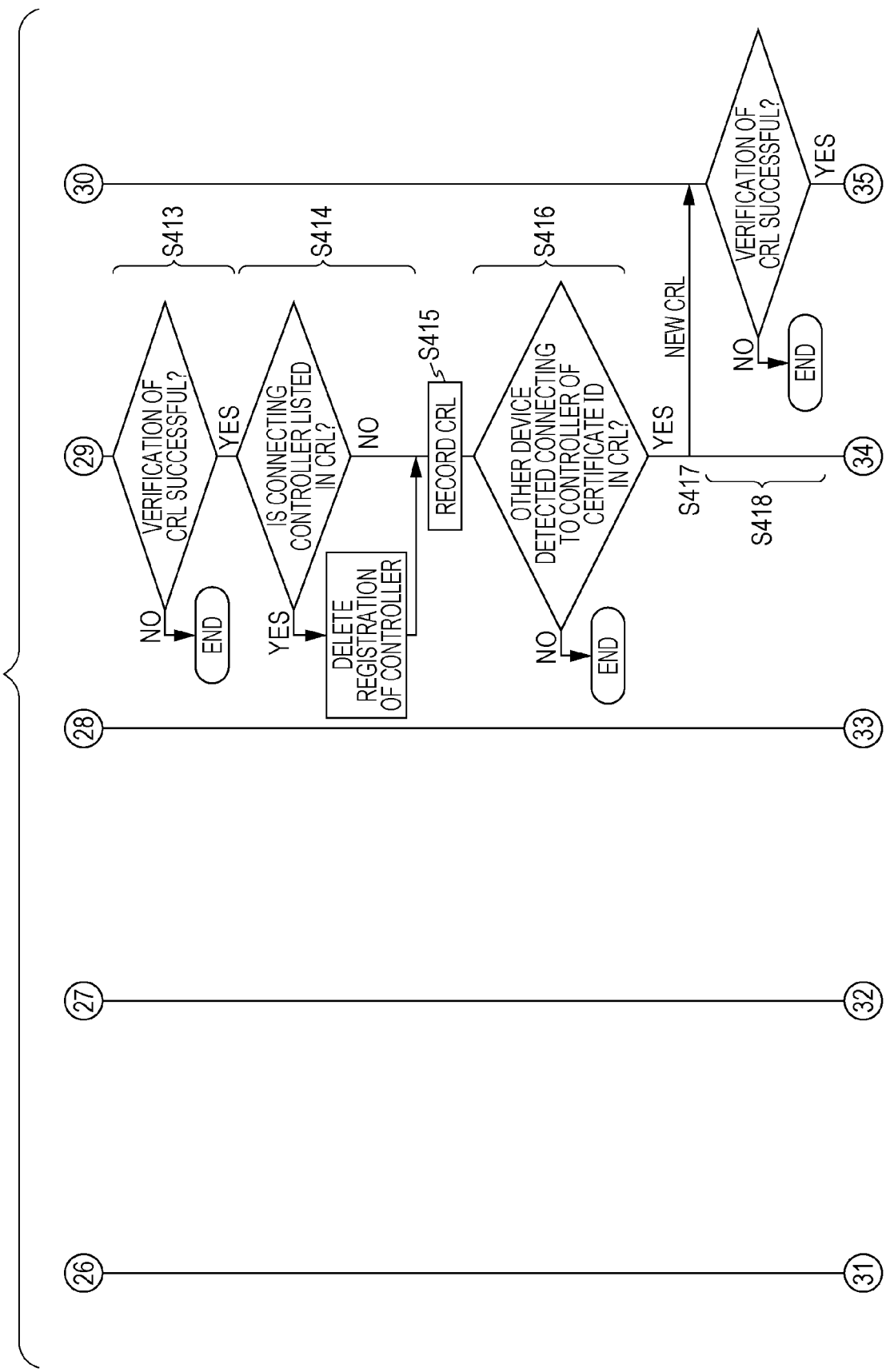
FIG. 29 is a sequence diagram for when updating the CRL of a device according to the fourth embodiment.
Figure 30:
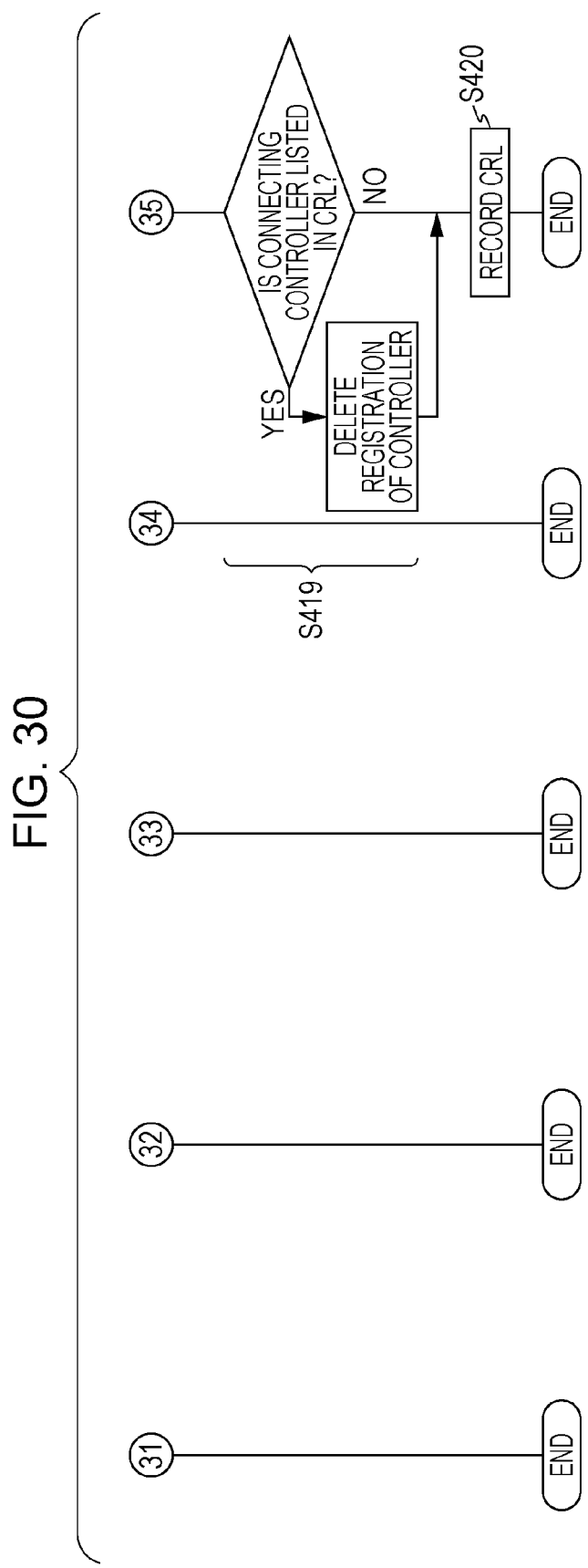
FIG. 30 is a sequence diagram for when updating the CRL of a device according to the fourth embodiment.

FIG. 26 is a diagram illustrating the overall configuration of the authentication system 10b according to the present disclosure. The authentication system 10b is configured including the controllers 100, devices 200, servers 300, and portal server 400, in the same way as in the first embodiment.

In the fourth embodiment, an example is described where the device 200c is a device with a large storage capacity, and the device 200a and device 200b are devices with small storage capacity, in the same way as in the third embodiment.

The fourth embodiment illustrates an example where the configuration of connection is different from the first and third embodiments. The device 200a and device 200b are connected to the controller 100a, and the device 200b and device 200c are connected to the controller 100b. Note that the portal server 400 issues one CRL per certificate ID, in the same way as the third embodiment.

4.2 Operations of Authentication System 10b

Operations of the authentication system 10b include the following, as in the first and third embodiments.

(1) Device registration processing where connection is made from device to controller, and registration is made in server
(2) Processing to update CRL of manufacturer server 300a
(3) Processing to update CRL of device The processing of (1) and (2) is the same as in the first and third embodiments, so description will be omitted here. (3) will be described below with reference to the drawings.

4.2.1 Operations at Time of Device Registration Processing

FIGS. 27 through 30 illustrate the following processing sequence. If not connected to a controller having a public key certificate of a certificate ID listed in a new CRL, the device 200c confirms that a device with a small storage capacity is not connected to a controller having a public key certificate of a certificate ID listed in the CRL, and determines whether or not to transmit the CRL to the device with a small storage capacity. On the other hand, the device 200c unconditionally transmits the CRL to devices with a large storage capacity. An example will be described here where the device 200a and device 200b are connected to are connected to an unauthorized controller 100a, the device 200b receives the new CRL from the device 200c, and transmits the new CRL to the device 200a connected to the unauthorized controller 100a.

In S401, the service server 300b transmits the new CRL to the controller 100b. This is the CRL where the certificate ID of the public key certificate of the controller 100a is listed.

In S402, the controller 100b transmits the new CRL to the device 200c.

In S403, the device 200c verifies the signature of the received CRL. In a case where verification fails, the updating processing of the CRL ends.

In S404, the device 200c verifies whether or not any of the connecting controllers are listed in the CRL. If even one connecting controller is listed, registration of this unauthorized controller is deleted from the connecting controller management table.

In S405, the device 200c compares the CRL received from the controller 100b and the CRL in the authentication information storage unit, and verifies whether or not there is inconsistency. In a case where there is inconsistency, registration of the controller which is the distribution source of the CRL with inconsistency is deleted from the connecting controller management table.

In S406, the device 200c records the CRL received from the controller 100b.

In S407, the device 200c references the connecting device management table sorted by controller, and confirms the storage capacity of the devices starting from the first row of the table. If the subject device is a device with a large storage capacity, the device 200c transmits the new CRL to the subject device.

In S408, in a case where the device 200 in the connecting device management table sorted by controller is a device with a small storage capacity, the device 200c transmits a CRL update notification to the subject device. In this case, the device 200c transmits a CRL update notification to the device 200b.

In S409, upon receiving the CRL update notification from the device 200c, the device 200b references the connecting controller management table, extracts the controller IDs of the public key certificates of controllers other than the controller to which connection is shared with the device 200c. Here, the device 200b extracts the certificate ID of the public key certificate of the controller 100a.

In S410, the device 200b transmits to the device 200c the certificate ID of the public key certificate of the controller 100 extracted in S409. Here, the device 200b transmits the certificate ID of the public key certificate of the controller 100a.

In S411, the device 200c verifies whether or not the certificate ID received from the device 200b is listed in the CRL. In a case where the certificate ID is listed in the CRL, the device 200c transmits the CRL to the device 200b. In a case where the certificate ID is not listed in the CRL, the device 200c does not transmit the CRL to the device 200b.

In S412, the device 200c confirms whether or not the subject device is the last row in the table. If not the last row, the processing of S407 through S412 is performed with the device in the next row as the subject device. If the final row, the CRL updating processing ends.

In S413, the device 200b verifies the signature of the CRL received from the device 200c. If the verification fails, the CRL updating processing ends.

In S414, the device 200b verifies whether or not any of the connecting controllers are listed in the CRL. If even one connecting controller is listed in the CRL, registration of this unauthorized controller is deleted from the connecting controller management table. Here, registration of the controller 100a is deleted.

In S415, the device 200b records the CRL received from the device 200c. In S416, the device 200b detects all other devices connected to the controller having the public key certificate of the certificate ID listed in the CRL received from the device 200c. The device 200b detects the device 200a here. If nothing is detected, the CRL updating processing ends.

In S417, the device 200b transmits the CRL received from the device 200c to the device 200a.

In S418, the device 200a verifies the signature of the CRL received from the device 200b. If the verification fails, the CRL updating processing ends.

In S419, the device 200a verifies whether or not any of the connecting controllers are listed in the CRL. If even one connecting controller is listed, registration of this unauthorized controller is deleted from the connecting controller management table. Here, registration of the controller 100a is deleted.

In S420, the device 200a records the CRL received from the device 200b.

4.3 Advantages of the Fourth Embodiment

In the fourth embodiment, a device with a large storage capacity acquires, from a device with a small storage capacity, a certificate ID of a public key certificate of a controller other than to the controller to which the devices are connected in common, and determines whether or not to transmit a CRL to the device with a small storage capacity depending on whether or not the certificate ID is listed in the CRL. Further, upon receiving the new CRP from the device with a large storage capacity, the device with a small storage capacity transmits the new CRL to other devices connected to the controller having the public key certificate of the certificate ID listed in the CRL. Accordingly, even in a case where a device with a large storage capacity receives a CRL listing the certificate ID of a public key certificate of a controller to which it is not connected, the device with a large storage capacity can transmit the CRL to a device with a small storage capacity, and thus can prevent connection to an unauthorized controller Fifth Embodiment 5. System Configuration Here, an authentication system 10c according to the present disclosure will be described as an embodiment of the present disclosure, with reference to the drawings. In the fourth embodiment, when a CRL is updated, a device with a large storage capacity makes confirmation with a device with a small storage capacity regarding a certificate ID of a public key certificate of a controller other than the controller to which the devices are connected in common, and determines whether or not to transmit the CRL depending on whether the certificate ID is listed in the CRL. However, the device with a small storage capacity only has a minimally necessary CRL, and accordingly cannot tell when connecting to a new controller whether or not that controller is an authorized controller.

In the fifth embodiment, when connecting to a new controller, the device with a small storage capacity confirms with a device with a large storage capacity whether the new controller is an authorized controller or not. When confirming, the device with a small storage capacity transmits the certificate ID of the public key certificate of the new controller to the device with a large storage capacity, and the device with a large storage capacity determines whether connection to the new controller is permitted/forbidden depending on whether or not the certificate ID is listed in the CRL.

Description will be made here regarding an example where the storage capacity of the controller is small, the same as in the fourth embodiment. In a case where an authorized controller to which the device with a small storage capacity connects is a controller with a large storage capacity and has all CRLs, this controller may be queried. However, not all controllers have large storage capacity, so the usage case of the configuration described in the present embodiment will be described.

5.1 Overall Configuration of Authentication System 10c

Figure 31:
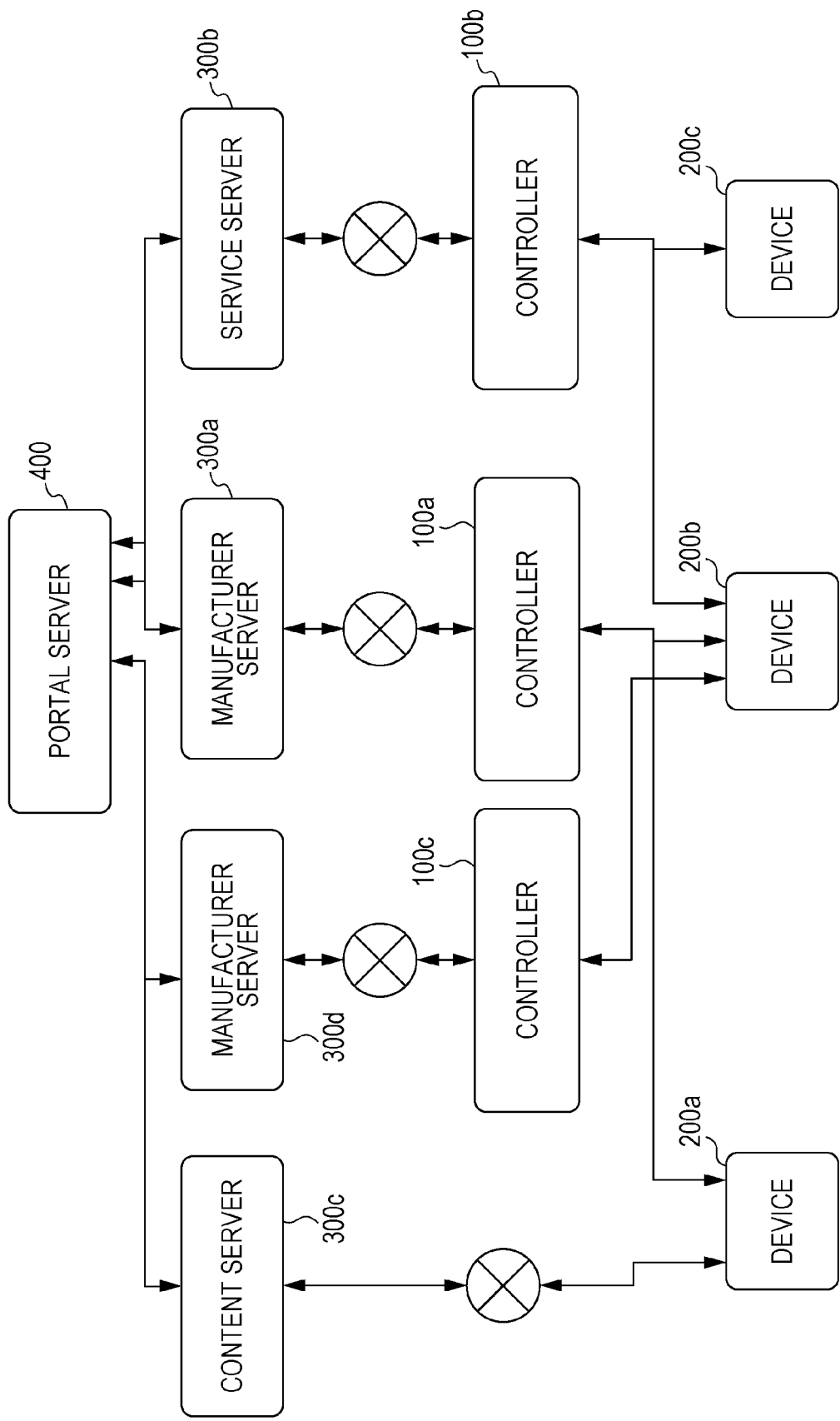
FIG. 31 is an overall configuration diagram of an authentication system according to a fifth embodiment.

FIG. 31 is a diagram illustrating the overall configuration of the authentication system 10c according to the present disclosure. The authentication system 10c is configured including the controllers 100, devices 200, servers 300, and portal server 400, in the same way as in the first embodiment. Although a new controller 100c is added to the configuration of the first embodiment, the configuration is the same as with the controllers 100a and 100b according to the first embodiment, so description will be omitted. Also, a connecting manufacturer server 300d to which the controller 100c is added, but the configuration is the same as with the server 300a according to the first embodiment, so description will be omitted.

In the fifth embodiment, an example is described where the device 200c is a device with a large storage capacity, and the device 200a and device 200b are devices with small storage capacity, in the same way as in the fourth embodiment. Here, the device with a large storage capacity holds all CRLs that have been issued, while the devices with small storage capacity hold minimally necessary CRLs.

Also, in the fifth embodiment, the device 200a and device 200b are connected to the controller 100a, and the device 200b and device 200c are connected to the controller 100b. The device 200b is attempting to connect to the controller 100c, and the controller 100c is connected to the server 300d. Note that the portal server 400 issues one CRL per certificate ID in the same way as in the fourth embodiment.

5.2 Operations of Authentication System 10c

Operations of the authentication system 10c include the following, as in the first third, and fourth embodiments.

(1) Device registration processing where connection is made from device to controller, and registration is made in server (2) Processing to update CRL of manufacturer server (3) Processing to update CRL of device The processing of (2) is the same as in the first, third, and fourth embodiments, and the processing of (3) is the same as in the fourth embodiment, so description will be omitted here. (1) will be described below with reference to the drawings.

5.2.1 Operations at Time of Device Registration Processing 5.2.1.1 Processing of Creating Connecting Device Management Table Sorted by Controller which Device 200c Performs The processing for creating the connecting device management table sorted by controller which the device 200c performs in the operations at the time of device registration processing according to the present embodiment additionally includes operations of registering the device 200c as a CRL update query destination for devices with a small storage capacity, in the operations of the third embodiment.

Figure 41:
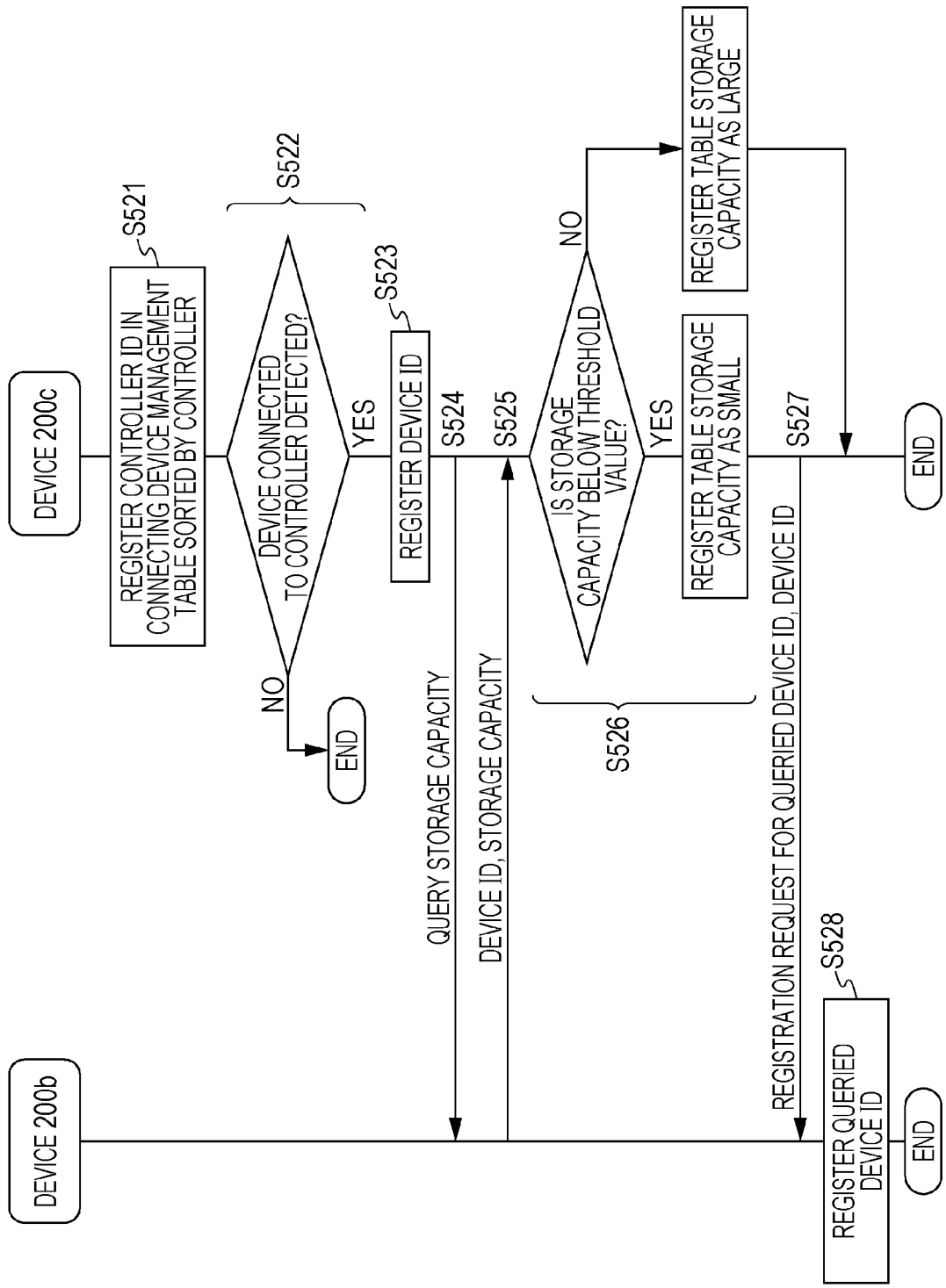
FIG. 41 is a sequence diagram of controller registration processing for when registering a device in the fifth embodiment.

FIG. 41 illustrates a sequence after a device has registered a controller to the connecting controller management table at the time of device registration. An example will be described here of processing where the device 200c detects other devices connected to the controller 100a when performing device registration with the controller 100a, and registers the device IDs of the detected IDs in the rows of the controller 100a.

Operations S521 through S526 performed between the device 200c and a device which the device 200c has detected is the same as the processing of S321 through S326 in the third embodiment, so description thereof will be omitted, and description will be made from S527.

In S527, the device 200c transmits a query destination device ID registration request to the device with a small storage capacity, to register the device ID of the device 200c as the CRL update query destination. The device ID of the device 200c is also transmitted at this time.

In S528, upon having received the query destination device ID registration request, the device 200b registers the device ID of the device 200c. The received device ID is stored in the device information storage unit 203, for example.

Figure 32:
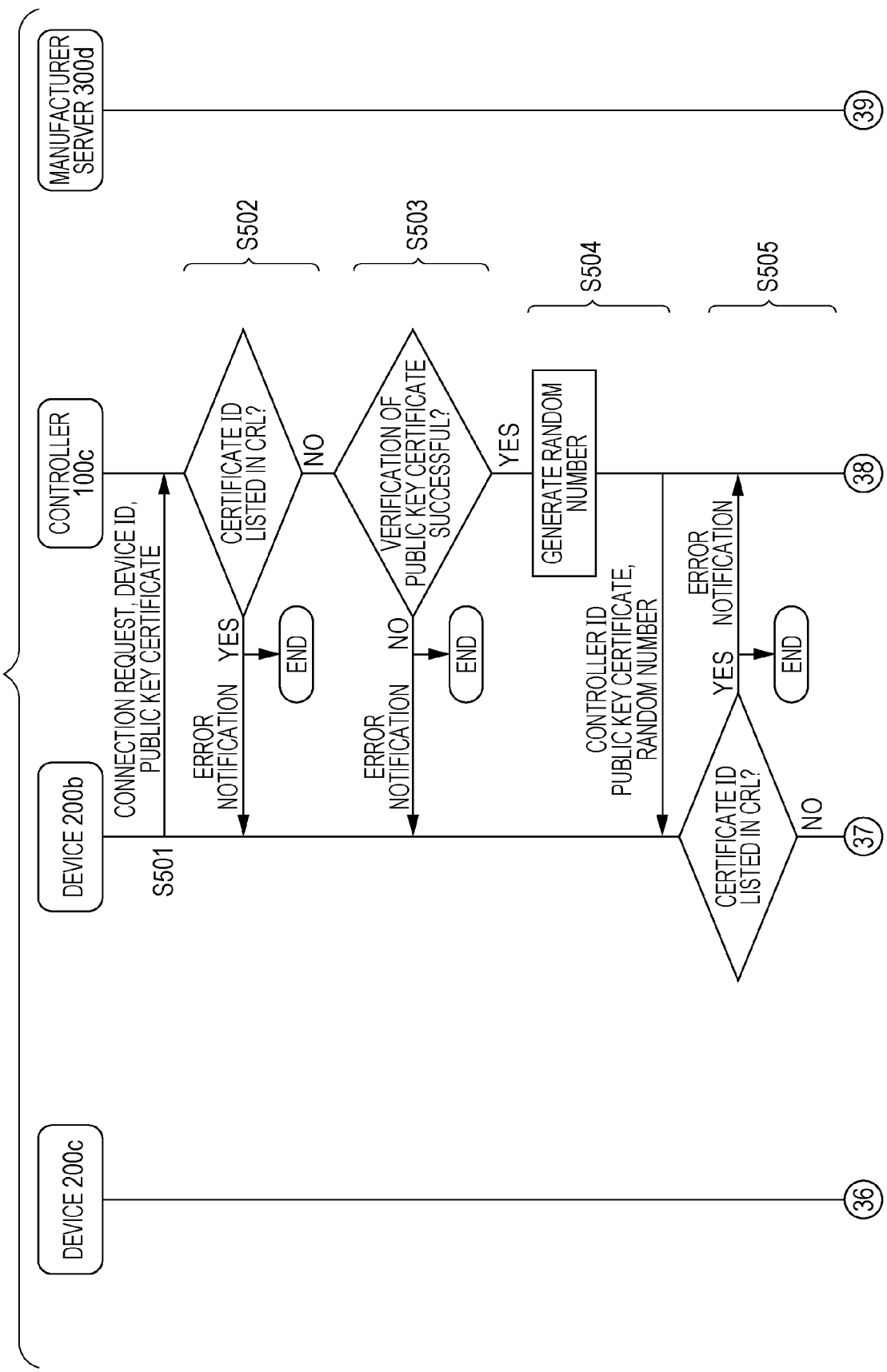
FIG. 32 is a sequence diagram for when updating the CRL of a device according to the fifth embodiment.
Figure 33:
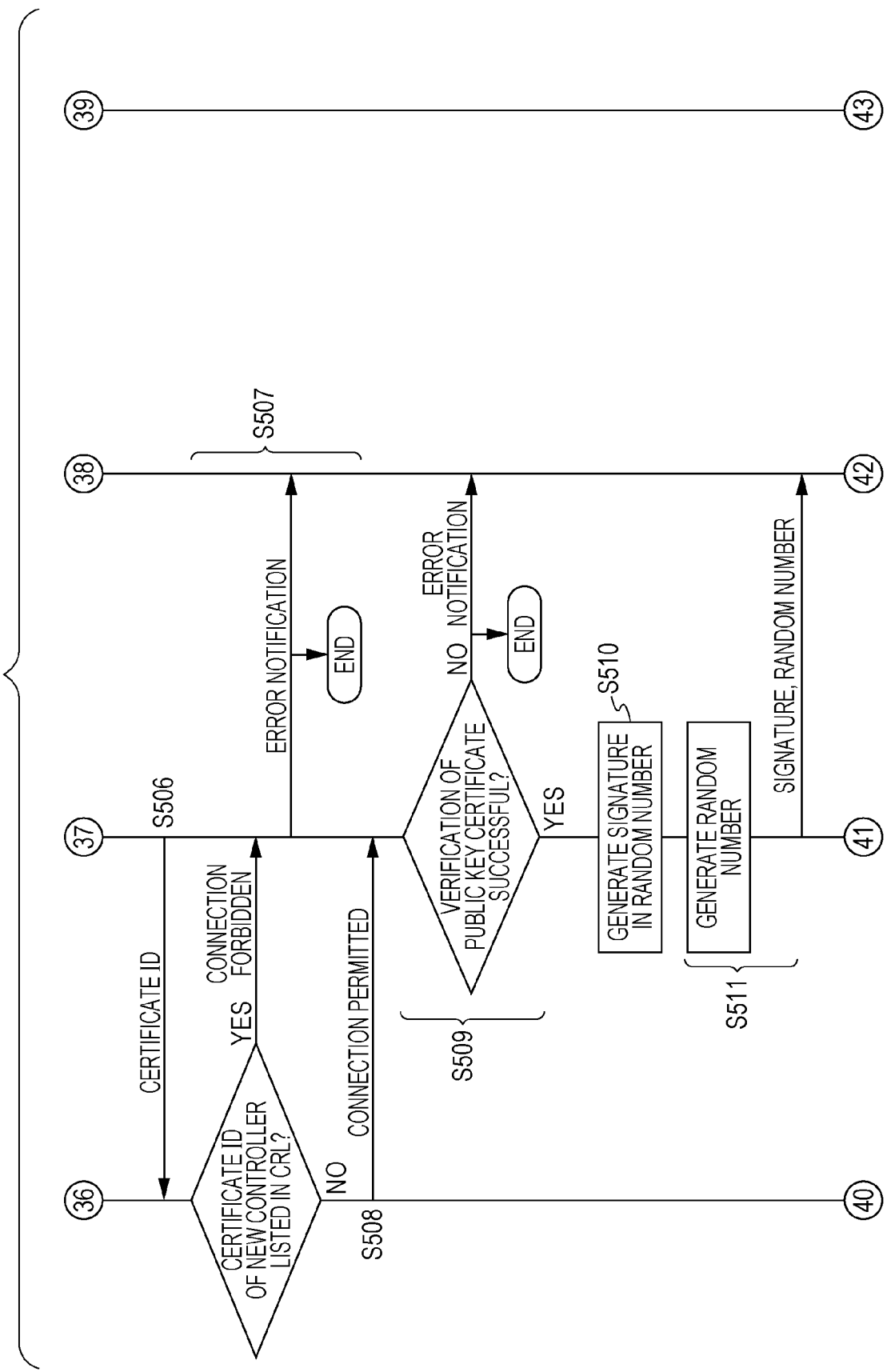
FIG. 33 is a sequence diagram for when updating the CRL of a device according to the fifth embodiment.
Figure 34:
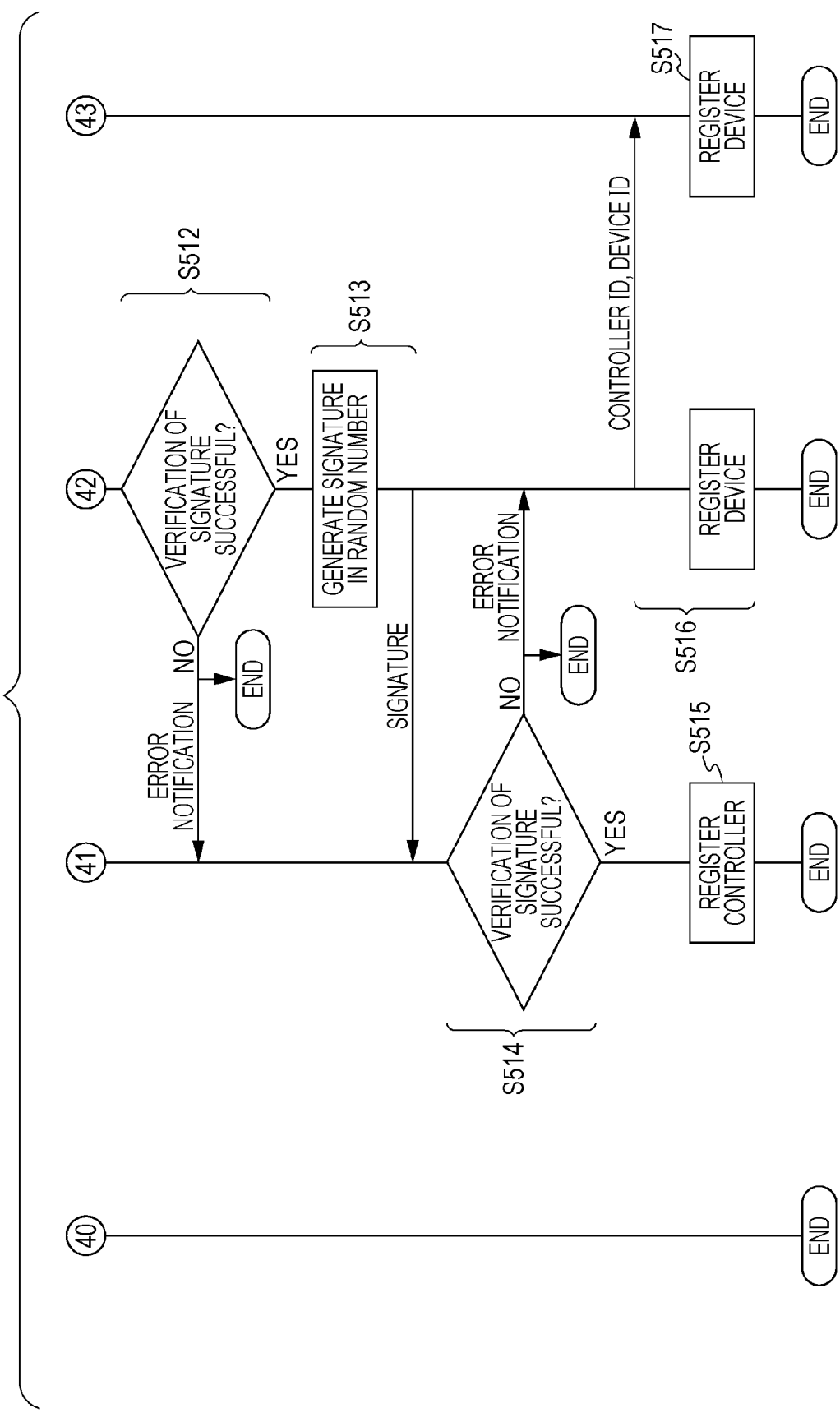
FIG. 34 is a sequence diagram for when updating the CRL of a device according to the fifth embodiment.

5.2.1.2 Device Registration Processing to Controller 100c that Device 200b Performs FIGS. 32 through 34 illustrate the processing of a device with a small storage capacity querying a device 200c with a large storage capacity regarding whether a new controller is an authorized controller at the time of device registration to the new controller, and the device 200c determining whether connection to the new controller is permitted or forbidden. An example where the device 200b queries the device 200c at the time of device registration to the controller 100c is described here. The processing of device registration to the new controller 100c when the device 200a is connected to the controller 100b is also the same.

Operations S501 through S504 at the time of device connection processing performed between the device 200b and the controller 100c are the same as S101 through S104 in the first embodiment, so description will be made from S505.

In S505, the device 200b verifies whether or not the certificate ID of the public key certificate of the controller which has transmitted the connection request is listed in the CRL it holds. If listed in the CRL, a controller error is notified and the processing ends. Here, whether or not the certificate ID of the controller 100c is listed in the CRL is verified.

In S506, the device 200b references the query destination device ID, and transmits the certificate ID of the public key certificate of the controller 100c to the device 200c of the query destination device ID.

In S507, the device 200c verifies whether or not the certificate ID received from the device 200b is listed in the CRL which is held in the authentication information storage unit. If listed in the CRL, a notification forbidding connection to the device 200b is transmitted. The device 200b transmits an error notification to the controller 100c, and the device registration processing ends.

In S508, if the certificate ID is not registered in the CRL, the device 200c transmits a notification permitting connection to the device 200b.

In S509, the device 200b verifies the signature of the public key certificate received from the controller 100c. If the verification fails, an error notification is transmitted to the controller 100c, and the device registration processing ends.

In S510, the device 200b generates a signature from the random number received from the controller 100c and the secret key of the device 200b.

In S511, the device 200b generates a random number, and transmits this to the controller 100c along with the signature generated in S510.

The operations S512 through S517 at the time of device registration processing performed among the device 200b, controller 100c, and manufacture server thereafter, is the same as the processing of S109 through S144 in the first embodiment, so description will be omitted.

5.3 Advantages of Fifth Embodiment

According to the fifth embodiment, a device with a small storage capacity queries a device with a large storage capacity regarding whether a new controller is an authorized controller at the time of device registration to the new controller, and the device with a large storage capacity determines whether connection to the new controller is permitted or forbidden. Accordingly, in a case where a controller to which a device with a small storage capacity newly connects is an unauthorized controller, connection to the unauthorized connector can be prevented at the stage of device connection.

6. Other Modifications

Although the present disclosure has been described based on the above embodiments, it is needless to say that the present disclosure is not restricted to the above embodiment. The following arrangements are also included in the present disclosure.

(1) In the above embodiments, the controller may acquire a CRL from the server during the device registration processing. Acquisition may be periodically performed outside of device registration processing. Acquisition may also be performed at the server before the next issue date of the CRL.

(2) While the device communicates with the server via the controller, or the device communicates with the content server 300c, to acquire a CRL in the above embodiments, this is not restrictive, and the CRL may be acquired via a mobile terminal connected to the server. Communication between the mobile terminal and the device may be near field communication (NFC) or Bluetooth (a registered trademark) communication.

(3) Although other devices 200 and controllers are notified when a device determines a controller to be unauthorized in the above embodiments, in a case where the devices or controllers that receive the notification have display functions, a display screen to the effect that an unauthorized controller has been detected may be output. Also, in a case where there is no display screen, an error code may be displayed or a lamp made to blink.

Accordingly, the user having the unauthorized controller can confirm the display, and can replace the unauthorized controller.

(4) While challenge-response authentication using a shared key is performed in the above second embodiment, this is not restrictive, and Extensible Authentication Protocol Pre-Shared Key (EAP-PSK) may further be performed using the authentication method described in Request for Comments (RFC) 5191.

(5) The key for encrypted communication may be exchanged at the time of device registration processing in the above first embodiment. Diffie-Hellman (DH) or ECDH may be used as the key exchange method.

(6) In the above embodiments, the controller may display the power consumption of the devices to which connection is to be made, the amount of electric power charged in a battery, and the amount of power generated by a solar generator.

(7) The controller in the above embodiments may be a power distribution board installed in a home.

(8) Communication between the controller and device in the above embodiments may be Wi-Fi, Specified Low Power Wireless, Power Line Communication, or Bluetooth (a registered trademark).

(9) Although the portal server 400 issues CRLs as a certificate authority in the above embodiments, this is not restrictive; the manufacturer server 300a, service server 300b, and content server 300c may serve as certificate authorities and issue CRLs.

(10) While CRLS are issued in the above embodiments including all certificate IDs of public key certificates of unauthorized controllers, this is not restrictive, and an arrangement may be made issuing CRLs regarding just devices which connect to the manufacturer server 300a, CRLs regarding devices and controllers relating to services provided by the service server 300b, and CRLs regarding just devices which can connect to the content server 300c. Further, CRLs may be issued for each device type or each year of manufacture of the device manufactured by the manufacturer of the manufacturer server 300a.

(11) In the third through fifth embodiments, a device with a large storage capacity transmits a CRL to a device with a small storage capacity each time the CRL is updated, but an arrangement may be made where the device with a small storage capacity queries the device with a large storage capacity periodically, and a CRL is transmitted as necessary. Accordingly, each time the device with a large storage capacity receives a new CRL, the CRLs of the devices can be updated without confirming the certificate ID of the public key certificate of the controller connecting to the device with a small storage capacity, thereby preventing connecting to an unauthorized controller.

Figure 37:
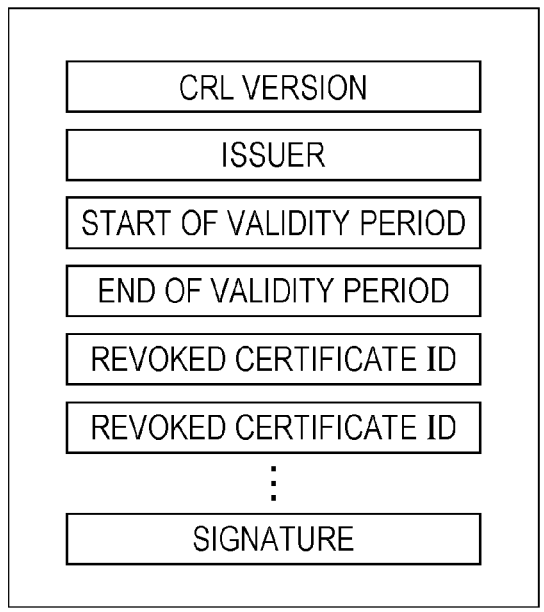
FIG. 37 is a configuration diagram of a CRL in a care of creating CRLs in batch according to a modification (12)

(12) Although one CRL is newly issued per each certificate ID1 of the public key certificate of the controller, thereby updating the CRLs, certificate IDs of revoked public key certificates may be added to one CRL and held in batch. Thus, the CRL to be recorded is a CRL to which a certificate ID has been added, so the size of the CRL can be reduced by an amount equivalent to the portions thereof other than the certificate ID, as compared to recording multiple CRLs issued for each certificate ID, and accordingly the storage amount can be reduced. FIG. 37 illustrates a configuration diagram of a CRL created in a case of batch CRL. The CRL includes the CRL version, issuer, start of validity period, end of validity period, certificate IDs of one or more revoked public key certificates, and a signature.

Figure 38:
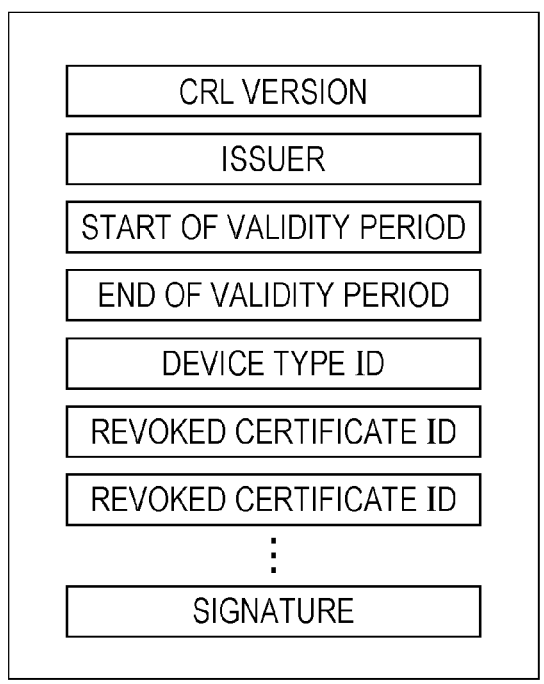
FIG. 38 is a configuration diagram of a CRL in a case of creating CRLs by device type in batch according to a modification (13)
Figure 39:
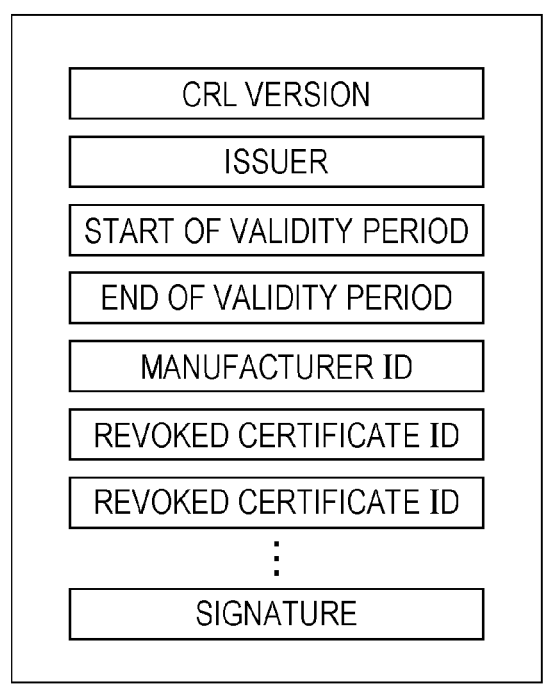
FIG. 39 is a configuration diagram of a CRL in a case of creating CRLs by manufacturer in batch according to the modification (13)

(13) In the above modifications, batch CRLs may be created with the CRL grouped by device type, by manufacture, or the like. FIG. 38 illustrates a configuration diagram of a CRL sorted by device type. The CRL includes the CRL version, issuer, start of validity period, end of validity period, device type ID, certificate IDs of one or more revoked public key certificates, and a signature. Also, FIG. 39 illustrates a configuration diagram of a CRL sorted by manufacturer. The CRL includes the CRL version, issuer, start of validity period, end of validity period, manufacturer ID, certificate IDs of one or more revoked public key certificates, and a signature.

(14) In the third embodiment, the last processing is the device 200b recording the CRL listing the certificate ID of the public key certificate of the controller 100a, received from the device 200c, but the CRL may be deleted after having cut off connection with the controller 100a. This enables reducing data amount in the storage medium. In a case of connecting to the controller 100a again, authentication processing for connecting to a new controller in the same way as in the fifth embodiment, thus preventing connecting to an unauthorized device.

(15) Although a device with large storage capacity transmits connection permitted/forbidden to a device with small storage capacity when registering the device with small storage capacity to a controller anew in the fifth embodiment, a CRL may be transmitted instead of forbidding connection. At this time, the device with large storage capacity transmits the CRL to the device with small storage capacity, the device with small storage capacity verifies the CRL, and avoids connecting to a controller having the public key certificate of the certificate ID listed in the CRL.

(16) In the third embodiment, the storage capacity of devices is listed in the connecting device management table sorted by controller that a device with a large storage capacity holds, thereby registering devices in batch, but this may be divided into a connecting device management table sorted by controller that registers devices with a large storage capacity and a connecting device management table sorted by controller that registers devices with a small storage capacity. When updating a CRL, a device having a connecting device management table sorted by controller unconditionally transmits the CRL to devices listed in the connecting device management table sorted by controller where devices with a large storage capacity are registered. A device having a connecting device management table sorted by controller determines whether or not to transmit the CRL to devices listed in the connecting device management table sorted by controller in which are registered devices with a small storage capacity, based on whether or not the certificate ID of the public key certificate corresponding to the connecting controller ID is listed in the CRL. Accordingly, a device having a connecting device management table sorted by controller can transmit the CRL to devices with a large storage capacity that are listed in the connecting device management table sorted by controller, without confirming the device capacity at the time of referencing the connecting device management table sorted by controller, and thus can reduce the load of CRL updating processing which the device having the connecting device management table sorted by controller performs.

(17) An arrangement may be made in the above modifications where the devices with a small storage capacity are grouped by controller ID, and transmission performed accordingly. Thus, the device holding the connecting device management table sorted by controller can identify the devices with small storage capacity and controller ID and thus transmit CRLs, thereby further reducing the load of CRL updating processing which the device having the connecting device management table sorted by controller performs.

(18) The above devices specifically are computer systems configured including a microprocessor, read-only memory (ROM), random access memory (RAM), a hard disk unit, a display unit, a keyboard, a mouse, or the like. A computer program is recorded in the RAM or hard disk unit. The devices realize their functions by the microprocessor operating according to the computer program. The computer program here is configured by combining multiple command codes indicating instructions to the computer, to realize predetermined functions.

(19) Part or all of the components configuring the above device may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip.

While description has been made regarding a system LSI, there are different names such as integrated circuit (IC), LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(20) Part or all of the components of which the above-described devices may be configured as an IC card detachably mountable to each device or a standalone module. The IC card or module is a computer system configured including a microprocessor, ROM, RAM, and so forth. The IC card or module may include the above-described super-multi-functional LSI. The IC card or module achieves its functions by the microprocessor operating according to the computer program. The IC card or module may be tamper-resistant.

(21) The present disclosure may be the above-described methods, or may be a computer program which realizes these methods by a computer, or may be digital signals made up of the computer program.

The present disclosure may be the computer program or the digital signals recorded in a computer-readable recording medium, such as for example, a flexible disk, a hard disk, a compact disc ROM (CD-ROM), magneto-optical (MO) disk, digital versatile disc (DVD), DVD-ROM, DVD-RAM, Blu-ray Disc (BD, a registered trademark), semiconductor memory, or the like. The present disclosure may also be the digital signals recorded in these recording mediums.

The present disclosure may be an arrangement where the computer program or the digital signals are transmitted over an electric communication line, wireless or cable communication line, a network such as the Internet or the like, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(22) The above-described embodiment and the above-described modifications may be combined.

According to the present disclosure, when updating a CRL in a system where a device and controller are connected, a device with a large storage capacity detects a device with a small storage capacity, and does not transmit the CRL unless the controller to which that device is connected is a controller listed in the CRL, whereby the device with a small storage capacity can hold a minimally necessary CRL.

What is claimed is:

1. An authentication system, comprising:
   a first device that connects to a first controller by a first network and to a second controller by a second network; and
   a second device that connects to the second controller by the second network,
   wherein, upon the first device receiving a certificate revocation list from the first controller,
      the first device stores the received certificate revocation list from the first controller in a first device memory, together with all previously received certificate revocation lists received from the first controller,
      the first device then detects the second device, the second device having a previously determined storage capacity of a second device memory smaller than a predetermined threshold value, connected to the second controller to which the first device is connected, and
   upon confirmation of the storage capacity of the second device memory, the first device
      transmits the certificate revocation list to the second device in a case where the storage capacity of the second device is smaller than the predetermined threshold value, and also a certificate identifier of a public key certificate which the second controller to which the second device is connected has, is listed in the certificate revocation list, and
      does not transmit the certificate revocation list to the second device in the case where the storage capacity of the second device memory is smaller than the predetermined threshold value, and also the certificate identifier is not listed in the certificate revocation list,
      wherein when the second device receives the transmitted certificate revocation list from the first device, the second device stores only the transmitted certificate revocation list most recently received from the first device in the second device memory.

2. The authentication system according to claim 1,
   wherein, when the storage capacity of the second device is larger than the predetermined threshold value, the first device transmits the certificate revocation list to the second device.

3. The authentication system according to claim 1,
wherein the predetermined threshold value is a size of the certificate revocation list received from the first controller.

4. The authentication system according to claim 1,
wherein upon receiving the certificate revocation list from the first device, the second device stops connection to the second controller identified by the certificate identifier listed in the certificate revocation list.

5. The authentication system according to claim 1,
wherein the certificate revocation list includes at least a certificate revocation list version, issuer, issue date, next issue date, and signature of a portal server.

6. An authentication system, comprising:
a first device that connects to a first controller by a first network; and
a second device that connects to the first controller by the first network and to a second controller by a second network,
wherein, upon the first device receiving a certificate revocation list from the first controller,
the first device stores the received certificate revocation list from the first controller in a first device memory, together with all previously received certificate revocation lists received from the first controller,
the first device then detects the second device, the second device having a previously determined storage capacity of a second device memory smaller than a predetermined threshold value, connected to the first controller, and
upon confirmation of the storage capacity of the second device memory, the first device
acquires, from the second device, a certificate identifier of a public key certificate which the second controller has, when the storage capacity of the second device memory is smaller than the predetermined threshold value,
transmits the certificate revocation list to the second device in a case where the certificate identifier is listed in the certificate revocation list, and
does not transmit the certificate revocation list to the second device in a case where the certificate identifier is not listed in the certificate revocation list,
wherein when the second device receives the transmitted certificate revocation list from the first device, the second device stores only the transmitted certificate revocation list most recently received from the first device in the second device memory.

7. The authentication system according to claim 6,
wherein upon receiving the certificate revocation list from the first device, the second device stops connection to the second controller identified by the certificate identifier listed in the certificate revocation list.

8. The authentication system according to claim 6,
wherein, when the storage capacity of the second device is larger than the predetermined threshold value, the first device transmits the certificate revocation list to the second device.

9. The authentication system according to claim 6, further including a third device that connects to the second controller by the second network,
wherein, upon receiving the certificate revocation list from the first device, the second device
detects the third device connecting to the second controller having the public key certificate indicated by the certificate identifier listed in the certificate revocation list, and
transmits the certificate revocation list to the third device.

10. The authentication system according to claim 6,
wherein the certificate revocation list includes at least a certificate revocation list version, issuer, issue date, next issue date, and signature of a portal server.

11. An authentication system, comprising:
a first device that connects to a first controller by a first network; and
a second device that connects to the first controller by the first network and to a second controller by a second network,
wherein the second device
receives, from the second controller, a certificate identifier of a public key certificate of the second controller at a time of connecting to the second controller, and transmits the certificate identifier to the first device,
wherein upon the first device receiving a certificate revocation list from the first controller in a first device memory, together with all previously received certificate revocation lists received from the first controller,
the first device then detects the second device, the second device having a previously determined storage capacity of a second device memory smaller than a predetermined threshold value, connected to the second controller to which the first device is connected, and
upon confirmation of the storage capacity of the second device memory, the first device
transmits a certificate revocation list to the second device in a case where the storage capacity of the second device memory is smaller than the predetermined threshold value, and also the certificate identifier received from the second device is listed in the certificate revocation list that the first device holds, and
does not transmit the certificate revocation list to the second device in a case where the storage capacity of the second device memory is smaller than the predetermined threshold value, and also the certificate identifier is not listed in the certificate revocation list that the first device holds, and
wherein only the transmitted certificate revocation list most recently received from the first device is stored in the second device memory, and the second device performs authentication processing using the stored certification revocation list.

12. The authentication system according to claim 11,
wherein in a case of having received the certificate revocation list, the second device confirms that the certificate identifier is listed in the certificate revocation list, and stops connection to the second controller.

13. The authentication system according to claim 11,
wherein the certificate revocation list includes at least a certificate revocation list version, issuer, issue date, next issue date, and signature of a portal server.

14. An authentication method in an authentication system, including a first device that connects to a first controller by a first network and to a second controller by a second network, and a second device that connects to the second controller by the second network, the authentication method comprising:

receiving, by the first device, a certificate revocation list from the first controller;

storing, by the first device, the received certificate revocation list from the first controller in a first device memory, together with all previously received certificate revocation lists received from the first controller;

detecting, by the first device, the second device, the second device having a previously determined storage capacity of a second device memory smaller than a predetermined threshold value, connected to the second controller to which the first device is connected; and upon confirmation of the storage capacity of the second device memory, the first device transmitting, by the first device, the certificate revocation list to the second device in a case where the storage capacity of the second device memory is smaller than the predetermined threshold value, and also a certificate identifier of a public key certificate which the second controller to which the second device is connected has, is listed in the certificate revocation list; and not transmitting, by the first device, the certificate revocation list to the second device in the case where the storage capacity of the second device memory is smaller than the predetermined threshold value, and also the certificate identifier is not listed in the certificate revocation list, wherein when the second device receives the transmitted certificate revocation list from the first device, the second device stores only the transmitted certificate revocation list most recently received from the first device in the second device memory.

15. The authentication method according to claim 14, wherein the certificate revocation list includes at least a certificate revocation list version, issuer, issue date, next issue date, and signature of a portal server.

16. An authentication method in an authentication system, including a first device that connects to a first controller by a first network, and a second device that connects to the first controller by the first network and to a second controller by a second network, the authentication method comprising:

receiving, by the first device, a certificate revocation list from the first controller;

storing, by the first device, the received certificate revocation list from the first controller in a first device memory, together with all previously received certificate revocation lists received from the first controller;

detecting, by the first device, the second device, the second device having a previously determined storage capacity of a second device memory smaller than a predetermined threshold value, connected to the first controller; and upon confirmation of the storage capacity of the second device memory, acquiring, by the first device and from the second device, a certificate identifier of a public key certificate which the second controller has, when the storage capacity of the second device is smaller than the predetermined threshold value;

transmitting, by the first device, the certificate revocation list to the second device in a case where the certificate identifier is listed in the certificate revocation list; and not transmitting, by the first device, the certificate revocation list to the second device in a case where the certificate identifier is not listed in the certificate revocation list, wherein when the second device receives the transmitted certificate revocation list from the first device, the second device stores only the transmitted certificate revocation list most recently received from the first device in the second device memory.

17. The authentication method according to claim 16, wherein the certificate revocation list includes at least a certificate revocation list version, issuer, issue date, next issue date, and signature of a portal server.

18. An authentication method in an authentication system, including a first device that connects to a first controller by a first network, and a second device that connects to the first controller by the first network and to a second controller by a second network, the authentication method comprising:

connecting, by the second device, to the second controller;

receiving, by the second device and from the second controller, a certificate identifier of a public key certificate of the second controller at the time of connecting to the second controller, and transmitting the certificate identifier to the first device, wherein upon the first device receiving a certificate revocation list from the first controller in a first device memory, together with all previously received certificate revocation lists received from the first controller, the first device then detects the second device, the second device having a previously determined storage capacity of a second device memory smaller than a predetermined threshold value, connected to the second controller to which the first device is connected, upon confirmation of the storage capacity of the second device memory, the first device transmitting a certificate revocation list to the second device in a case where the storage capacity of the second device memory is smaller than the predetermined threshold value, and also the certificate identifier received from the second device is listed in the certificate revocation list that the first device holds; and not transmitting the certificate revocation list to the second device in a case where storage capacity of the second device memory is smaller than the predetermined threshold value, and also the certificate identifier is not listed in the certificate revocation list that the first device holds, wherein only the transmitted certificate revocation list most recently received from the first device is stored in the second device memory, and the second device performs authentication processing using the stored certification revocation list.

19. The authentication method according to claim 18, wherein the certificate revocation list includes at least a certificate revocation list version, issuer, issue date, next issue date, and signature of a portal server.

* * * * *